US011933171B2

(12) United States Patent
Chen et al.

(10) Patent No.: US 11,933,171 B2
(45) Date of Patent: Mar. 19, 2024

(54) ADAPTIVE DETECTION OF ABNORMAL CHANNELS FOR SUBSURFACE OPTICAL MEASUREMENTS

(71) Applicant: Halliburton Energy Services, Inc., Houston, TX (US)

(72) Inventors: Zhonghuan Chen, Singapore (SG); Bin Dai, Katy, TX (US); Christopher Michael Jones, Katy, TX (US); Wei Zhang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 230 days.

(21) Appl. No.: 17/568,380

(22) Filed: Jan. 4, 2022

(65) Prior Publication Data

US 2023/0212946 A1 Jul. 6, 2023

(51) Int. Cl.
| | |
|---|---|
| *G01N 21/85* | (2006.01) |
| *E21B 47/135* | (2012.01) |
| *E21B 49/08* | (2006.01) |
| *G01N 21/954* | (2006.01) |

(52) U.S. Cl.
CPC ........ *E21B 49/0875* (2020.05); *E21B 47/135* (2020.05); *G01N 21/85* (2013.01); *G01N 21/954* (2013.01); *G01N 2021/8571* (2013.01)

(58) Field of Classification Search
CPC ........... G01N 21/85; G01N 2021/8571; G01N 33/2823; E21B 49/0875; E21B 47/135
See application file for complete search history.

(56) References Cited

U.S. PATENT DOCUMENTS

| | | | |
|---|---|---|---|
| 10,502,052 B2 | 12/2019 | Barak et al. | |
| 10,927,672 B2 | 2/2021 | Dai et al. | |
| 2004/0069942 A1 | 4/2004 | Fujisawa et al. | |
| 2010/0192684 A1 | 8/2010 | Wu et al. | |
| 2011/0023594 A1 | 2/2011 | Pelletier et al. | |
| 2013/0213149 A1 | 8/2013 | Boe et al. | |
| 2014/0110105 A1 | 4/2014 | Jones et al. | |

(Continued)

FOREIGN PATENT DOCUMENTS

| | | |
|---|---|---|
| EP | 2320027 | 5/2011 |
| WO | 2012161694 | 11/2012 |

(Continued)

OTHER PUBLICATIONS

"International Search Report and Written Opinion, PCT Patent Application No. PCT/US2021/054428", dated May 26, 2022, 9 pages.

(Continued)

*Primary Examiner* — Maurice C Smith
(74) *Attorney, Agent, or Firm* — DeLizio, Peacock, Lewin & Guerra, LLP

(57) ABSTRACT

Light from a light source that has interacted with a sample of downhole fluid provided in a downhole optical tool is sequentially passed through a plurality of groups of light filters, each of the groups of light filters including of one or more light filters, to generate a data set for each of the groups of light filters, also referred to as a simultaneous channel group. The data generated for each of the simultaneous channel groups is then analyzed to determine if the data from that simultaneous channel groups is effective in providing information useful for the analysis of the sample of downhole fluid.

20 Claims, 8 Drawing Sheets

(56) References Cited

U.S. PATENT DOCUMENTS

| | | |
|---|---|---|
| 2014/0195215 A1 | 7/2014 | Chen et al. |
| 2014/0306096 A1 | 10/2014 | Freese et al. |
| 2015/0377776 A1 | 12/2015 | Xie |
| 2019/0017377 A1 | 1/2019 | He et al. |
| 2019/0100995 A1 | 4/2019 | He et al. |
| 2019/0162066 A1 | 5/2019 | Chen et al. |
| 2019/0353632 A1 | 11/2019 | Pelletier et al. |
| 2019/0390534 A1* | 12/2019 | Trehan .................. E21B 41/00 |
| 2020/0240264 A1 | 7/2020 | He |
| 2020/0284140 A1 | 9/2020 | Jones et al. |
| 2020/0364593 A1* | 11/2020 | Al-Hajri et al. |
| 2020/0378250 A1 | 12/2020 | Olapade et al. |
| 2020/0400017 A1 | 12/2020 | Olapade et al. |
| 2020/0400858 A1 | 12/2020 | Olapade et al. |
| 2021/0047924 A1 | 2/2021 | Kallehbasti et al. |
| 2021/0054737 A1 | 2/2021 | Dai et al. |
| 2021/0071522 A1 | 3/2021 | Dai et al. |
| 2021/0088447 A1 | 3/2021 | Stark et al. |
| 2021/0110246 A1 | 4/2021 | Chen et al. |
| 2021/0131951 A1 | 5/2021 | Dai et al. |
| 2021/0207478 A1 | 7/2021 | Pelletier et al. |
| 2021/0215033 A1 | 7/2021 | Jones et al. |
| 2021/0231001 A1 | 7/2021 | Jones et al. |
| 2021/0239000 A1 | 8/2021 | Olapade et al. |
| 2023/0097490 A1 | 3/2023 | Chen et al. |

FOREIGN PATENT DOCUMENTS

| | | | |
|---|---|---|---|
| WO | WO-2016171699 A1 * | 10/2016 | ........... E21B 47/102 |
| WO | 2017129738 | 8/2017 | |

OTHER PUBLICATIONS

"U.S. Appl. No. 17/481,165 Office Action", filed Jun. 1, 2023, 19 pages.

PCT Application No. PCT/US2022/070036, International Search Report and Written Opinion, dated Sep. 19, 2022, 12 pages.

"U.S. Appl. No. 17/481,165 Final Office Action", dated Aug. 18, 2023, 6 pages.

* cited by examiner

ADAPTIVE DETECTION OF ABNORMAL CHANNELS FOR SUBSURFACE OPTICAL MEASUREMENTS

TECHNICAL FIELD

The disclosure generally relates to the field of measuring formation fluid properties, and more particularly to increasing accuracy in formation fluid measurements.

BACKGROUND

Hydrocarbon producing wells include wellbores that are typically drilled at selected locations into subsurface formations in order to produce hydrocarbons. A drilling fluid, which can also be referred to as "mud," is used during drilling of the wellbores. Mud serves a number of purposes, such as cooling of the drill bit, carrying cuttings to the surface, providing pressure to maintain wellbore stability, preventing blowouts, sealing off the wellbore, etc. During and after drilling, the mud filtrate mixes with the fluid contained in the formation (formation fluid). The mud filtrate is a contamination in the formation fluids with regards to measurements or sampling of the downhole fluids. For safety purposes, a majority of the wellbores are drilled under over-burdened or overpressure conditions, i.e., the pressure gradient in the wellbore due to the weight of the mud column being greater than the natural pressure gradient of the formation in which the wellbore is drilled. Because of the overpressure condition, the mud penetrates into the formation surrounding the wellbore to varying depths, thereby contaminating the natural fluid contained in the formation.

In formation sampling and testing, data from a downhole sensor are routinely converted to variable inputs of fluid characterization models. However, the accuracy of this analysis is reduced by factors such as an improperly selected calibration or unexpected physical perturbations near the sensor. This inaccuracy is exacerbated by the contaminant effects of the mud in the formation fluid.

BRIEF DESCRIPTION OF THE DRAWINGS

Embodiments of the disclosure may be better understood by referencing the accompanying drawings.

Figure 1:
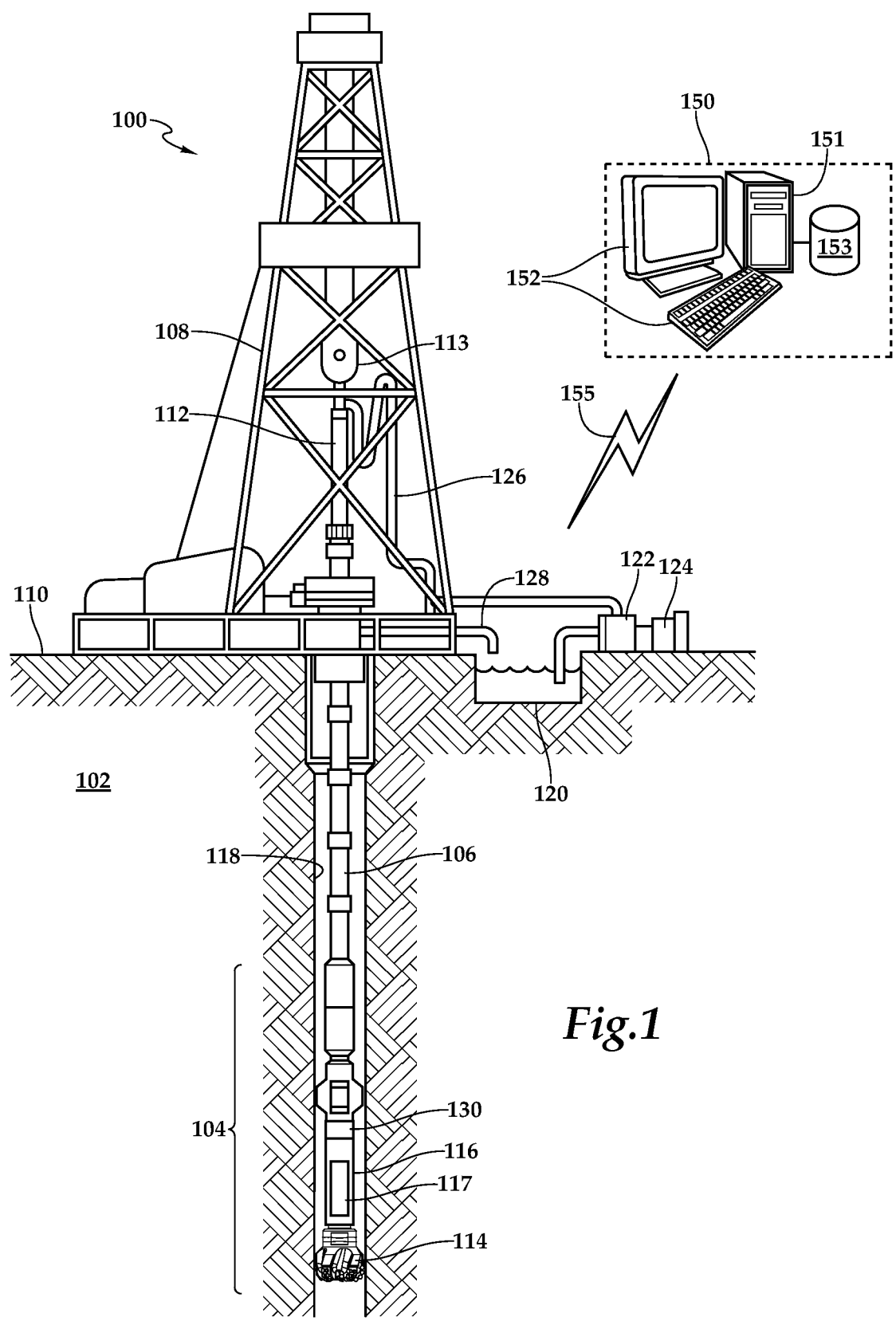
FIG. 1 illustrates a well system, in accordance with various embodiments.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts are typically marked throughout the specification and drawings with the same or coordinated reference numerals. The drawing figures are not necessarily to scale. Certain features of the invention may be shown exaggerated in scale or in somewhat schematic form, and some details of conventional elements may not be shown in the interest of clarity and conciseness.

DETAILED DESCRIPTION

In the following detailed description of the illustrative embodiments, reference is made to the accompanying drawings that form a part hereof. These embodiments are described in sufficient detail to enable those skilled in the art to practice the techniques and methods described herein, and it is understood that other embodiments may be utilized and that logical structural, mechanical, electrical, and chemical changes may be made without departing from the scope of the disclosure. To avoid detail not necessary to enable those skilled in the art to practice the embodiments described herein, the description may omit certain information known to those skilled in the art. The following detailed description is, therefore, not to be taken in a limiting sense.

The embodiments described herein relate to systems, apparatus, methods, and techniques that may be used to perform adaptive detection of abnormal channels for optical data measurements made on sampled subsurface fluids. The sampled subsurface fluids may include formation fluids that have been contaminated with other fluids, such as water and/or drilling mud. Data collected from optical channels determined to be "abnormal channels" may be labeled as abnormal because the data from that channel is determined to provide little or no useable information regarding the formulation and/or the state of the sample of fluid that has been interacted with an source of light, which has then been optically filtered by one or more optical filters. The data associated with the detected abnormal channel(s) is taken out of the data sets used to perform the data analysis, thus providing a more accurate measure of the composition and status of the sampled subsurface fluids. The determination that a channel is "abnormal," and thus will not provide useful information, or will provide inaccurate data regarding the status of the sample of fluid being tested, is based on the methods and techniques further described below. The process of determining whether a channel is classified as "normal" or "abnormal" may be done on a continuous basis as new data regarding the samples of subsurface fluid are collected, thus making the process of determining the classification of a channel an adaptive process.

In the subsurface optical measurement of the sampled fluids, optical filters may be used to condition light beams that have interacted with the fluid samples. However, some optical filters may be not so sensitive to the compositions of mud fluids and formation fluids. The sampled fluid mixture can be single phase fluid flow (in which mud filtrate dissolves fully in the formation fluids, commonly appeared in oil-based mud cases), or multi-phase fluid flow (where mud filtrate cannot dissolve into the formation fluid due to their differences of chemical properties, commonly appeared in water-based mud cases). The optical data observed on these optical filters may be not effective for classification in multiphase cases, and/or may not be reliable for composition analysis in single phase cases. The apparatus, systems, methods, and techniques described in this disclosure addresses the problem of adaptively detecting the abnormal channels of the optically filtered light beams, and thereby improve the analysis of subsurface optical measurements of formation fluids.

Subsurface formation fluids are mixtures of multiple chemical compounds, including water, alkanes, cycloalkanes, aromatics, and asphaltic hydrocarbons. Their compositions and distributions provide important information for field engineers to make decisions on field development. Accurate gas composition (such as light methane, ethane) also helps managers to decide the installation of expensive production facilities. Optical spectral measurement is a widely used approach for chemical analysis of these subsurface formation fluids. Optical spectral measurements may be used to measure the light-absorption responses of light interacting with the subsurface formation fluids on a wide wavelength band, and inverse for the compositions based on their characteristic wavelengths of each chemical molecule. However, in field cases, it often costs too much and cannot meet the real time measurement requirement to sample the subsurface fluids and transfer it to a chemical laboratory under the same pressure and temperature conditions, and it is impossible or impractical to design a full band optical spectroscopy for subsurface use.

The current use of practical subsurface spectroscopy tools are usually designed with only a few optical channels being utilized instead of optical channels covering a full wide wavelength band. These optical filters in current use are normally designed with specific and unique transfer functions, which are assumed to be effective to separate the most common fluid compositions. However, due to the complicated compositions of the subsurface fluids, not all pre-designed optical filters can provide effective information related to the actual the fluid compositions. The effectiveness and reliability of optical measurement on each channel is very significant to the composition inversion based on the subsurface optical observations.

In addition, during the subsurface optical measurements the formation fluids needed to be analyzed are always mixed with the mud fluids. Assessment of the mud fluid contamination is an important of the aspect of the formation fluids for field engineers to be able to determine in order to be aware subsurface status, and to make decisions for proper operation and safety regarding a well system. Further, as the actual compositions of mud filtrate being applied to a well system are usually commercial secrets, optical transfer functions being utilized to analyze the subsurface fluids cannot be optimized for the unknown mud filtrate, and composition analysis becomes even more complicated. Moreover, in the cases of water-based mud, the mixed fluids may be a multi-phase fluid flow, an additional fluid identification is needed before composition analysis can be performed. However, not all pre-configured optical filters that may be used for optical analysis of the subsurface fluids are sensitive enough to differentiate the spectra between mud filtrate and formation fluids in field applications. As mud fluid ratio estimation is based on the fluid identification of each channel or included in a simultaneous channel group, fluids identification on the ineffective optical channels are not reliable, and it may lead to an inaccurate mud contamination analysis. The inaccurate mud fluid ratio estimation may (1) mislead the field engineer's decision, (2) lead to a wrong formation signature construction, and (3) further affect the final composition analysis.

The apparatus, systems, methods and techniques described in this disclosure focus on the above problems of detecting the abnormal channels, which are not sensitive, and thus not useful, for composition analysis and/or are not effective for mud/formation fluids identification. The apparatus, systems, methods, and techniques described in this disclosure utilize an adaptive measure of effectiveness driven by the optical data itself, which improve mud contamination analysis for multiphase fluid cases, and provide reliability information for composition analysis in single phase fluid cases.

FIG. 1 illustrates a well system 100, in accordance with various embodiments. Well system 100 is configured to include and use optical components for measuring properties of downhole material, such as downhole fluids, to determine the chemical composition or other aspects of the downhole materials, including analysis of multiphase fluids. The resultant downhole material properties information may be utilized for various purposes, such as for modifying a drilling parameter or configuration, such as penetration rate or drilling direction, in a measurement-while-drilling (MWD) and a logging-while-drilling (LWD) operation. Well system 100 may be configured to drive a bottom hole assembly (BHA) 104 positioned or otherwise arranged at the bottom of a drill string 106 extended into the earth 102 from a derrick 108 arranged at the surface 110. Derrick 108 may include a kelly 112 and a traveling block 113 used to lower and raise kelly 112 and drill string 106.

BHA 104 may include a drill bit 114 operatively coupled to a tool string 116 that may be moved axially within a drilled wellbore 118 as attached to the drill string 106. During operation, drill bit 114 penetrates the earth 102 and thereby creates wellbore 118. BHA 104 may provide directional control of drill bit 114 as it advances into the earth 102. Tool string 116 can be semi-permanently mounted with various measurement tools 117 such as, but not limited to, MWD and LWD tools, which may be configured to perform downhole measurements of downhole conditions. In some embodiments, the measurement tools 117 include optical measurement tool(s) as described in this disclosure, and may be self-contained within tool string 116.

In well system 100, drilling fluid from a drilling fluid tank 120 may be pumped downhole using a pump 122 powered by an adjacent power source, such as a prime mover or motor 124. The drilling fluid may be pumped from the tank 120, through a standpipe 126, which feeds the drilling fluid into drill string 106, which conveys the drilling fluid to drill bit 114. The drilling fluid exits one or more nozzles arranged in drill bit 114, and in the process cools the drill bit. After exiting drill bit 114, the drilling fluid circulates back to the surface 110 via the annulus defined between wellbore 118 and drill string 106, and in the process, returns drill cuttings and debris to the surface. The cuttings and mud mixture are passed through a flow line 128 and are processed such that a cleaned drilling fluid is returned down hole through standpipe 126.

Tool string 116 may further include a downhole optical tool 130 the same as or similar to the downhole tools described herein. More particularly, downhole optical tool 130 may have an optical sensor system comprising optical components arranged therein, and the downhole optical tool 130 may include a light source configured provide a light that interacts with samples of fluids drawn from the wellbore in the vicinity of the downhole optical tool 130, and a plurality of light filters configured to further filter the light after the light has interacted with the samples of fluids. Downhole optical tool 130 further includes detectors to detect and measure one or more parameters of the light after the light has been filtered by the one or more of light filters, and computing devices, such as computer processor(s) ad computer memory, which are configured to process output signals provided by the detectors and to generate data related to the status of the sampled fluids, as further described herein. The computer memory included as part of the downhole optical tool 130 may include instructions that, when operated on by processor(s) of the downhole optical tool, control the operations of the optical tool in order to perform any of the operations and provide any of the features ascribed to the downhole optical tool. In various embodiments, downhole optical tool 130 is configured to communicate with one or more other computer devices, such as user interface 150, which may be located above surface 110, and proximate the site of the wellbore 118, or remotely located from the site of the wellbore. A downhole optical tool according to various embodiments is illustrated and described below with respect to FIG. 3.

Referring back to FIG. 1, embodiments of well system 100 may include a user interface device, as illustratively represented in FIG. 1 by user interface 150. User interface 150 may include a computing device 151, such as a personal computer, a lap-top computer, or some other type of user interface device, such as a smart phone. In various embodiments, user interface 150 includes one or more input/output devices 152, for example a display device such as a computer monitor, which is configured to provide visual display of data and other information related to well system 100 and/or to a fluid treatment process being performed on or modeled for wellbore 118. In various embodiments, the display device is configured to display information regarding data received at user interface 150 from the downhole optical tool 130 related to the status and/or other parameters associated with the downhole fluids being sampled and analyzed by the downhole optical tool. The computer system of user interface 150 may include one or more additional input devices, such as a computer keyboard, computer mouse, and/or a touch screen that allows a user, such as a technician or engineer, to provide inputs to user interface 150, which may include requests for information regarding the status of well system 100 and/or inputs that may be used to direct the operations of the downhole optical tool 130. Connections between user interface 150 and other devices included in in well system 100 may be provided by wired and/or wireless communication connection(s), as illustratively represented by lightning bolt 155.

User interface 150 is communicatively coupled to a non-volatile computer readable memory device 153. Memory device 153 is not limited to any particular type of memory device. Memory device 153 may store instructions, such as one or more applications, that when operated on by the processor(s) of the computing device 151, are configured to control the operations of one or more of the devices included in well system 100. Any combination of one or more machine readable medium(s) may be utilized. The machine readable medium may be a machine readable signal medium or a machine readable storage medium. A machine readable storage medium may be, for example, but not limited to, a system, apparatus, or device, which employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 2:
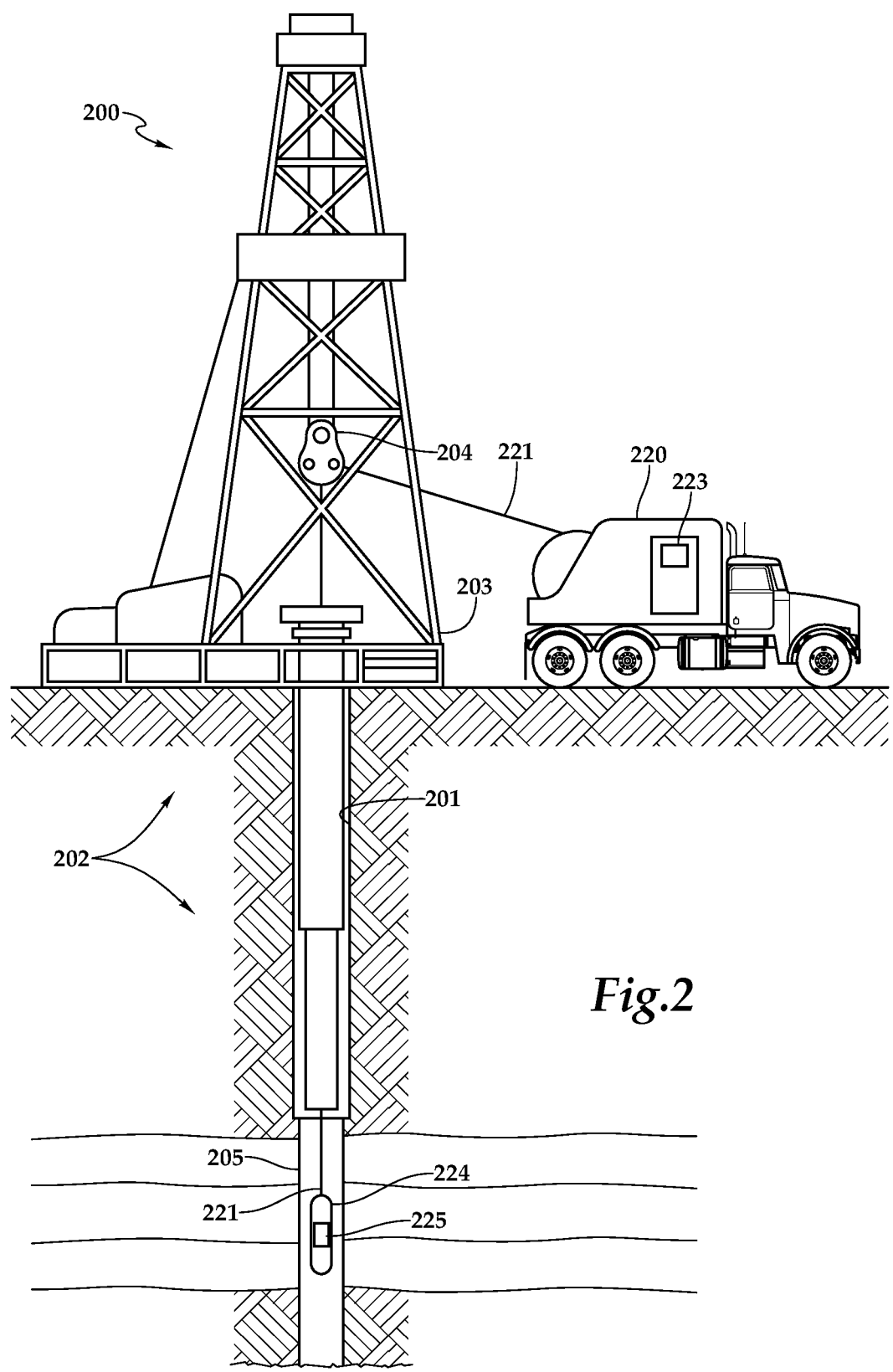
FIG. 2 illustrates a wireline system, according to various embodiments.

FIG. 2 illustrates a wireline system 200, according to various embodiments. In some embodiments, wireline system 200 may be configured to use a downhole optical tool, such as the radiometry system 300 as illustrated and described below with respect to FIG. 3. Referring back to FIG. 2, after drilling of wellbore 201 is complete, it may be desirable to determine details regarding composition of formation fluids and other downhole fluids, and associated properties of these downhole fluids, through wireline sampling. Wireline system 200 may include a downhole tool 224 that forms part of a wireline logging operation, which may include a downhole optical tool 225, as described herein, as part of a downhole measurement tool. Wireline system 200 may include a derrick 203 that supports a traveling block 204 Downhole tool 224, which may be a probe or sonde, may be lowered by a wireline cable 221 into wellbore 201 extending into formation material 202.

Downhole tool 224 may be lowered to potential production zone 205 or other regions of interest within wellbore 201, and used in conjunction with other components, such as packers and pumps, to perform well testing and sampling. Downhole optical tool 225 may be configured to perform any of the functions, and to provide any of the features as described throughout this disclosure ascribed for an optical tool, and any equivalents thereof. More particularly, downhole tool 224 may include the downhole optical tool 225, comprising optical components configured to perform analysis of downhole fluids using the radiometric characterization testing as described herein or any equivalents thereof. In various embodiments, downhole optical tool 225 may be configured to measure optical responses of the downhole fluids, and any measurement data generated by downhole tool 224 and its associated downhole optical tool 225 can be real-time processed for decision-making, and/or communicated to a surface logging facility 220 for storage, processing, and/or analysis. Logging facility 220 may be provided with electronic equipment 223, including processors for various types of data and signal processing equipment configured to perform at least some steps of the methods consistent with the present disclosure. In various embodiments, electronic equipment may comprise any or all of the components described above with respect to user interface 150. Downhole optical tool 225 may be configured to perform any of the functions, and to provide any of the features as described throughout this disclosure ascribed for an optical tool, and/or any equivalents thereof.

Figure 3:
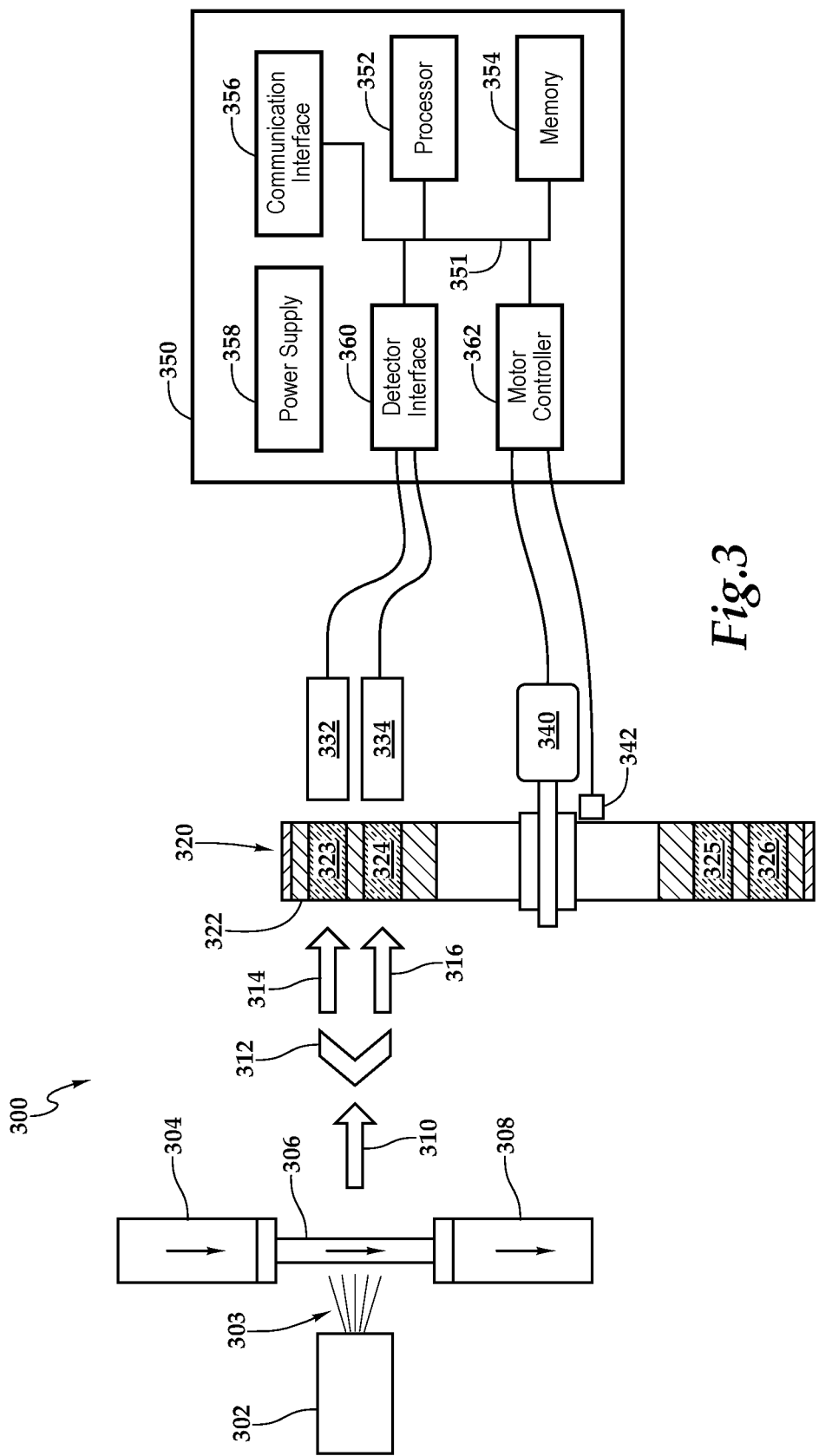
FIG. 3 is a block diagram depicting a radiometry system, in accordance with various embodiments.

FIG. 3 is a block diagram depicting an optical system 300 in accordance with various embodiments. Optical system 300 includes sub-systems, devices, and components configured to implement techniques for components and systems that implement field EM radiation measurement operations that may be utilized for optical analysis of downhole fluids. Optical system 300 may be included in the measurement tools of a wellbore system as part of a drilling operation, for example as measurement tools 117 and/or 130 of well system 100 as illustrated and described with respect to FIG. 1. In various embodiments, optical system 300 may be included in the measurement tools provided as part of a wireline system, for example as optical tool 225 of wireline system 200 as illustrated and described above with respect to FIG. 2.

Referring back to FIG. 3, the optical train within optical system 300 includes light source 302. Light source 302 may comprise a broad-spectrum or narrow-spectrum source that generates source light 303, which may include light in the visible, infrared, and/or ultraviolet spectra ranges. Example implementations of light source 302 include electroluminescence sources such as an electroluminescent lamp, laser, LED, etc.

Optical system 300 may include components configured to circulate sampled downhole fluids, which have been taken into system 300 while system 300 is positioned downhole within a wellbore, and pass the sampled fluid through a fluid transmission path that allows light 303 provided by light source 302 to interact with the sampled fluid. In various embodiments, the sampled fluids are mixtures of formation fluid and mud filtrate. Optical system is configured to measure the spectra of the mixture of the formation fluids and mud filtrate for example to determine a level of mud filtrate contamination in the formation fluid included in the sample. As shown in FIG. 3, optical system 300 includes an upper conduit 304 in fluid communication with a clear conduit 306. Clear conduit 306 is formed from a transparent material, such as glass, which allows light 303 to be directed to and to interact with the sampled fluids, which are passing through the clear conduit. Clear conduit 306 is in fluid communication with lower conduit 308. Upper conduit 304, clear conduit 306, and lower conduit 308 form a fluid pathway, indicated by the downward pointing arrows illustrated within each of these devices, which allows sampled fluids to be passed through these devices, including passing through the clear conduit 306. As the fluids pass through clear conduit 306, light 303 is directed toward the clear conduit, wherein the light interacts with the fluid passing thought the clear conduit. An interacted version of the light 310 exits the clear conduit having interacted with the fluid passing through the clear conduit 106 at the time.

The interacted light 310 may be altered in some manner, for example with respect to the wavelengths of light present in the interacted light, compared to the light 303 provided by light source 302 due to the interaction of the light with the fluid passing through the clear conduit 306. As such, the properties of the interacted light 310 may be indicative of one or more properties of the fluid that had interacted with the interacted light 310 exiting the clear conduit 306. In various embodiments, after exiting the clear conduit 306, the interacted light 310 is directed to a beam splitter 312. Beam splitter 312 is configured to split the interacted light 310 in various embodiments into two separated interacted beams of light 314 and 316. The interacted beams of light 314 and 316 are then directed to a rotary wheel assembly 320 that includes a plurality of light filters. As shown in FIG. 3, the first interacted beam of light 314 is directed to a first filter 323 provided on the rotary wheel 322. The second interacted beam of light 316 is directed to a second filter 324 provided on the rotary wheel 322.

First filter 323 acts as a light filter configured to filter various band(s) of wavelengths of light by allowing certain bands of wavelengths of light to pass through the first filter, while blocking other band(s) of wavelengths of light. As the first interacted beam of light 314 passes through first filter 323, the wavelengths of light present in the first interacted beam of light are further filtered based on the configuration of first filter 323. The wavelengths of light, if any, from the first interacted beam of light 314 that pass through first filter 323 are detected and measured by detector 332. Detection may include both detection of the wavelength(s) present in the light received at the detector 332, and measurement of the intensity level of the light received at the detector.

Similarly, second filter 324 acts as a light filter configured to filter various band(s) of wavelengths of light by allowing certain bands of wavelengths of light to pass through the second filter, while blocking other band(s) of wavelengths of light. As the second interacted beam of light 316 passes through second filter 324, the wavelengths of light present in the second interacted beam of light are further filtered based on the configuration of first filter 324. The wavelengths of light, if any, from the second interacted beam of light 316 that pass through second filter 324 are detected and measured by detector 334. Detection may include both detection of the wavelength(s) present in the light received at the detector 334, and measurement of the intensity level of the light received at the detector.

Detectors 332 and 334 are configured to provide output signals indicative of one or more parameters measured from the respective filtered light beams received at each of the detectors. The first interacted light beam 314 and the second interacted light beam 316 are provided to the respective light filters 323, 324 at the same time, and the resulting filtered light beams arrive at and are detected by detectors 332 and 334 at a same time. As such, the light beams are considered as a "pair" of light beams, and the resulting detected light resulting from the detection of the light beams at detectors 332 and 334 are considered to be a "simultaneous channel group" comprising two separate light beams that interact with the sample of fluid in clear conduit 306 at a same time. The simultaneous channel group would include light which has interacted with the sampled fluid at a same time, but which may have then been altered in different ways by virtue of the differences between the particular optical filters through which the divided light beams were passed. The output signals associated with the simultaneous channel group are communicated to a computing device 350, which in various embodiments is located within the downhole tool as part of system 300. Computing device 350 is configured to receive the output signals comprising the simultaneous channel group as provided by detectors 332 and 334, and to further process the output signals to perform various analysis of the signals, including the contamination analysis of the mud filtrate (either oil-based mud or water-based) in the sampled fluids (in either single phase or multiphase cases) and composition analysis of the formation fluids.

In addition to light filters 323 and 324, rotary wheel 322 may include a plurality of pairs of light filters. An embodiment of a rotary wheel having a plurality of pairs of light filters is fuirther illustrated and described below with respect to FIG. 4. Referring back to FIG. 3, the rotary wheel 322 of system 300 includes an additional pair of light filters 325 and 326. Light filters 325 and 326 as shown in FIG. 3 do not alight with the paths for the first interacted beam of light 314 or for the second interacted beam of light 316. However, rotary wheel assembly 320 is configured to be rotatable so that additional pairs of light filters, including light filters 325 and 326, may be sequentially brought into alignment with the respective paths of first interacted beam of light 314 and the second interacted beam of light 316. In various embodiments, rotary wheel assembly 320 is coupled through a hub of the rotary wheel 322 to a rotary actuatable device 340, such as a stepper motor or a servo motor. Rotary actuatable device 340 is configured to rotate the rotary wheel assembly 320 to various positions, wherein each of the positions aligns one pair of light filters of the rotary wheel 322 with the respect light paths of the first interacted beam of light 314 and the second interacted beam of light 316.

In various embodiments, computer device 350 includes motor controller 362 configured to control the operation of motor 340 in order to rotate the rotary wheel assembly 320 so that the pairs of light filters included in the rotary wheel 322 are brought into alignment with the light paths of first interacted beam of light 314 and second interacted beam of light 316 for a specified period of time, and in some predetermined order. In various embodiments, each pair of light filters may be brought into alignment with the light path of first interacted beam of light 314 and the second interacted beam of light 316 for a predetermined amount of time, for example 0.5 seconds, and then motor controller 362 controls motor 340 to rotate the rotary wheel assembly 320 to another position where a different pair of light filters is brought into alignment with first interacted beam of light 314 and the second interacted beam of light 316. This process of aligning light filters with the light paths may be repeated a number of times, so that each of the light filter pairs included in rotary wheel 322 is aligned with the light paths of first interacted beam of light 314 and the second interacted beam of light 316 multiple times. Embodiments may include an encoder 342 that is configured to provide an output signal, for example to motor controller 362, wherein the output signal is indicative of the position of rotary wheel 322. This output signal may be used to control motor 340 to assure proper alignment of the light filter pairs with the path of the light beams being provided by beam splitter 312, and/or to provide information about which particular pair of light filters is aligned with the light paths at any given time. Each time a pair of light filters is aligned with the light path, a subsequent set of detected light parameters may be generated for the simultaneous channel group. Multiple sets of detected light parameters for each of the simultaneous channel groups may be generated, and analyzed according to the various methods and techniques as described herein, and any equivalents thereof.

The embodiments of optical system 300 including a beam splitter configured to split the interacted light 310 into two separate interacted beams of light 314 and 316, and to provide to the interacted beams of light 314 and 316 to a rotary wheel 322 having two light filters 323, 324 arranged to align with the interacted beams of light 314 and 316, respectively, at a same time to generate two filtered channels of light as provided to detectors 332 and 334 is one possible arrangement for the optical system. Embodiments of optical system 300 are not limited to arrangements that include a beam splitter, such as beam splitter 312, and may be configured to have the interacted light 310 be aligned with a single (one) optical filter on a rotary wheel 322 at any given time. For each designated rotary position of rotary wheel, a single filtered channel of light may be provided to a single detector, such as either one of detectors 332, 334, and the output from the single detector provided to computing device 350, as described in a similar manner for the dual detector arrangement. In such an arrangement including a single light channel, a "simultaneous channel group" comprises the filtered light output from a single light filter.

In alternative embodiments of optical system 300, interacted light 300 may be provided to one or more beam splitters configured to produce more than two separate light beams, for example three, four, or more separated light beams that have been split from interacted light 310. Each of these separated light beams may then be provided to a device, such as a rotary wheel, having a number of light filters corresponding to the number of separated light beams. Each of the separated light beams is directed to pass through a respective one of the light filters on the device (e.g., a rotary wheel) at a same time, thereby generating a corresponding number interacted light beams forming a "simultaneous channel group" having a number of channels corresponding to the number of separated light beams and light filters aligned with the separated light beams at a given time. For each designated rotary position of rotary wheel, each individual one of the filtered channels of light may be provided to a respective individual detector, similar to or the same as detectors 332, 334, and the output from each of the individual detectors provided to computing device 350, as described in a similar manner for the dual detector arrangement. In such arrangements of the optical tool that includes more than two separated light beams, a "simultaneous channel group" comprises the filtered light outputs from a number of channels corresponding to the number of separated light beams that are filtered by light filters at a same time. As such, it would be understood the embodiments of optical tool 300 may comprise any positive integer number of channels included in a simultaneous channel group that may be filtered at a same time using a corresponding number of optical filters.

Still referring to FIG. 3, computing device 350 may include some combination of processor 352, memory 354, communication interface 356, power supply 358, detector interface 360, and motor controller 362. The various devices included in computing device 350 may be communicatively coupled through a bus 351. Bus 351 is not limited to any particular type of bus or bus structure, and is not limed to any particular communication protocol, and may include one or more bus structures using one or more communication protocols that allow for communication of data and/or program instructions to occur between the devices included in computing device 350 and system 300. Processor 352 may comprise a single processor, or multiple processors. Memory 354 may include non-volatile memory. Memory 354 may store instructions, that when executed by processor 352, perform any of the functions and provide any of the features ascribable to a processor and system 300, as described throughout this disclosure. In various embodiments, power supply 358 is configured to provide electrical power to operate any of the devices included in computing device 350. In various embodiments, power supply 358 may be configured to provide power to operate one or more devices located outside of computing device 350, such motor 340, encoder 342, detectors 332, 334, and/or light 302. In various embodiments, detector interface 360 is configured to receive output signals provided by detectors 332 and 334. In various embodiments, detector interface 360 is configured to process the received output signals from the detectors, and to process these signals into a format or format(s) so that the information included in the output signals may be operated on by processor 352 and/or stored in memory 354.

In various embodiments, motor controller 362 is configured to receive instructions from one or more devices, such as processor 352 and/or detector interface 360, and to control the operation of motor 340 in order to thereby control the rotary positioning of the rotary wheel assembly 320 in a manner determined to be the desired operation of system 300. Communication interface 356 is configured to provide communications between computing device 350 and one or more other devices located downhole or at the surface of a well system, such as user interface 150 (FIG. 1) or electronic equipment 223 (FIG. 2). In various embodiments, communication interface 356 is configured to provide an output of data and/or other information related to the analysis and/or a status of the sampled fluid being analyzed by system 300, wherein the output of data and/or other information may be provided in real-time or near real-time, and for example may be communicated to the surface of the well system where system 300 is operating downhole.

Figure 4:
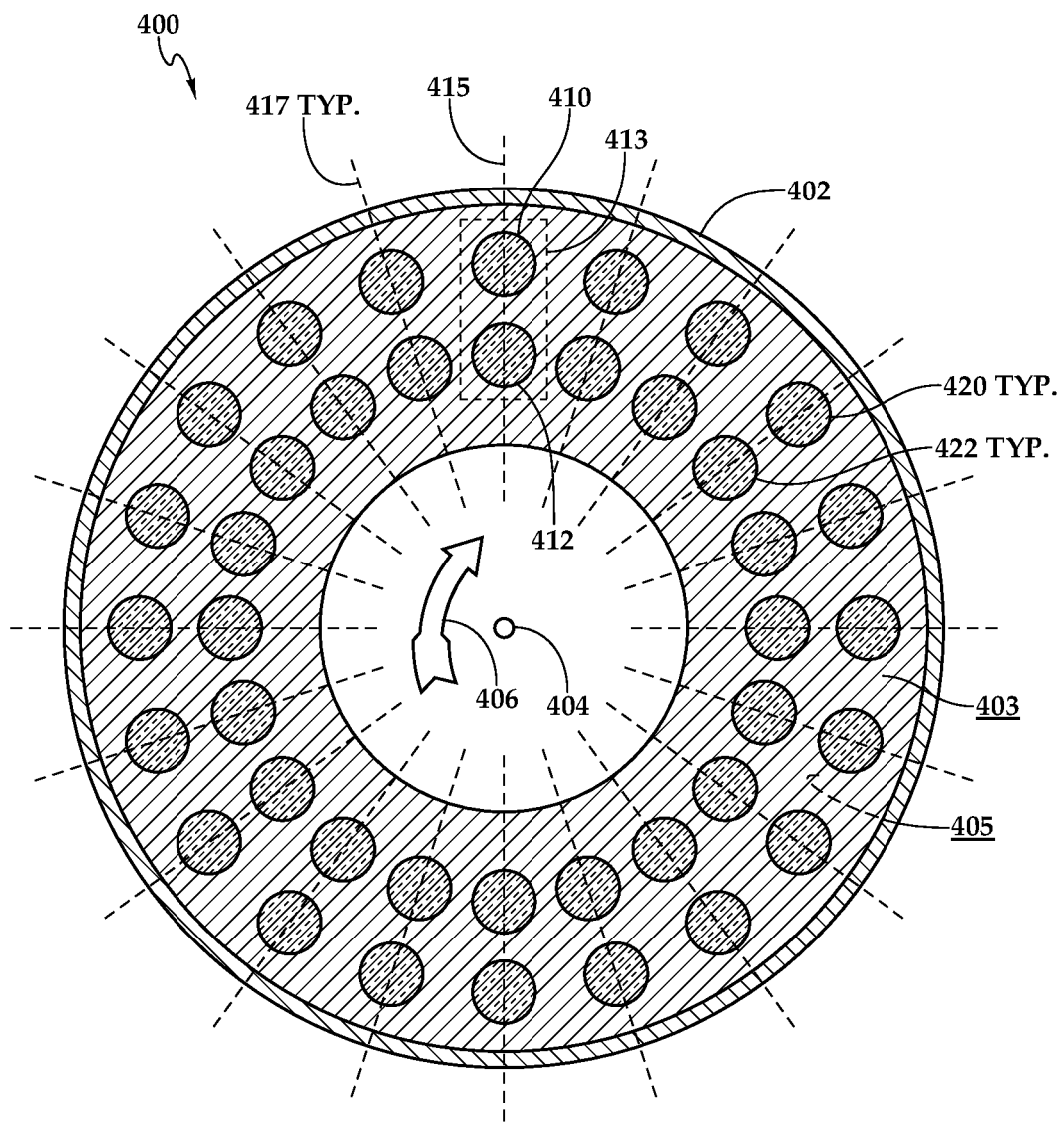
FIG. 4 illustrates a rotary wheel comprising a plurality of light filters, according to various embodiments.

FIG. 4 illustrates a rotary wheel assembly 400 comprising a plurality of light filters, according to various embodiments. Rotary wheel assembly (assembly) 400 comprises a disk 402 having a circular shape and a hollow center encircling a center point 404. The assembly 400 includes a thickness dimension extending from a front surface 403 of the assembly to a backside surface 405, the backside surface lying in a plane parallel to the front surface and separated from the front side surface by the thickness dimension. A plurality of light filters, 420 typical, 422 typical, extend through passageways in the disk 402 from the front surface 403 to the backside surface 405. Various ones of the light filters include translucent or transparent material that allow light to travel from an area proximate the front surface 403, through the light filter, and to an area proximate the backside surface 405.

In various embodiments, one or more of the light filters are configured to filter one or more wavelengths of light from the light passing through the particular light filter. In various embodiments, the passband or the filter bands of wavelengths of light that are filtered by each respective light filter is configured differently from other light filters included in disk 402. By using different configurations for the light filters, each of the light filters may be configured to provide an output of light passing through the light filter with certain characteristics, such as wavelength(s) of light, which are indicative of one or more properties of the fluid sample in the clear conduit 306 which the light entering the light filter has interacted with prior to entering the light filter.

In various embodiments, the arrangement of the light filters within disk 402 allow one or two or more different light filters provided with the disk to be brought into alignment with a pathway for the interacted light so that the interacted light will pass through one or more of the light filters at any given time, thereby generating a simultaneous channel group comprising the one or more channels of filtered light, the number of channels of filtered light include in the simultaneous channel group corresponding to the number of light filters brought into alignment with the interacted light at a same time. By also rotating the disk 402, for example in a stepped "stop-and-go" type movement, different sets of the light filter(s) may be brought into alignment with the pathway for the interacted light, thus providing a large number of filtered light samples, derived by passing the interacted light through the number of different light filters, and thus providing more diverse data for use in the fluid analysis process.

Using disk 402 as an example, the disk is provided with an outer row of light filters, 420 typical, formed in a circular ring inside the outer perimeter of the disk. An inner row of light filters, 422 typical, is formed in a circular ring inside the outer row of light filters, and located closer to the center point 404 compared to the outer row of light filters. In various embodiments, disk 402 may include just a single row of light filters, or in other embodiments may include two or more rows of light filters. As shown in two row embodiments of the disk as illustrated in FIG. 4, each light filter in the outer ring aligns with a corresponding light filter in the inner ring along a dashed line (417 typical) extending from the center point 404 and through the centers of both of the light filters. As shown in FIG. 4, light filter 410 included in the outer ring of light filters aligns along dashed line 415 with light filter 412 formed in the inner ring of light filters. Dashed box 413 illustrates how the alignment of light filter 410 and 413 forms a pair of light filters configured to filter light as a simultaneous channel group, and which can be brought into alignment with an interacted light at a same time to provide two channels of filtered light simultaneously. As shown in FIG. 4, each of the light filters in disk 402 in the outer ring is paired with a corresponding light filter in the inner ring. As such, as the assembly 400 is rotated, for example as represented by arrow 406, each pair of light filters configured to filter interacted light thereby forming a "simultaneous channel group" which may be brought into the position illustrated by dashed box 413. While in position at dashed box 413, each pair of light filters is aligned with the interacted light from an optical system, such as system 300 (FIG. 3) and thereby provides two filtered output channels of light in the area proximate the backside 405 of the disk.

As illustrated in FIG. 4, rotary wheel assembly 400 includes twenty total pairs of light filters, two light filters per pair, and therefore includes up to a total of forty light filters that may be used to filter interacted light using different filter characteristics. The total number of rows of light filters, and also the overall number of light filters included in rotary wheel assembly 400 is not limited to a particular number of light filters, and may vary with respect to the number of rows and/or the overall total number of light filters included per row, and thus varying the overall number of light filters that may be included in the various embodiments of the rotary wheel assembly 400. In various embodiments, one or more of the light filters may be opaque, or transparent while providing no light filtering capability. In such cases, the total number of light filters configured to provide a filtering of certain wavelengths of light and/or acting as a bandpass filter for certain wavelengths of light may be less than total number of light filters included in various embodiments of assembly 400.

Regardless, having the capability of providing many different light filters, having a variety of different filtering characteristics, allow the apparatus, systems, methods, and techniques as described herein to produce a large number of simultaneous channel groups, which can then be processed to detect and to remove abnormal channels as described herein, while still providing a system having the capability to measure and determine characteristics of the sampled fluid, such as multiphase stages that may exist in the sampled fluid being tested. Further, because this optical testing is being performed downhole, the reports regarding the statues of the sampled fluid may be generated and provided in real-time, or in near real-time, and based on the actual downhole status of the sampled fluid, without the need to bring samples of the downhole fluid to the surface.

Figure 5:
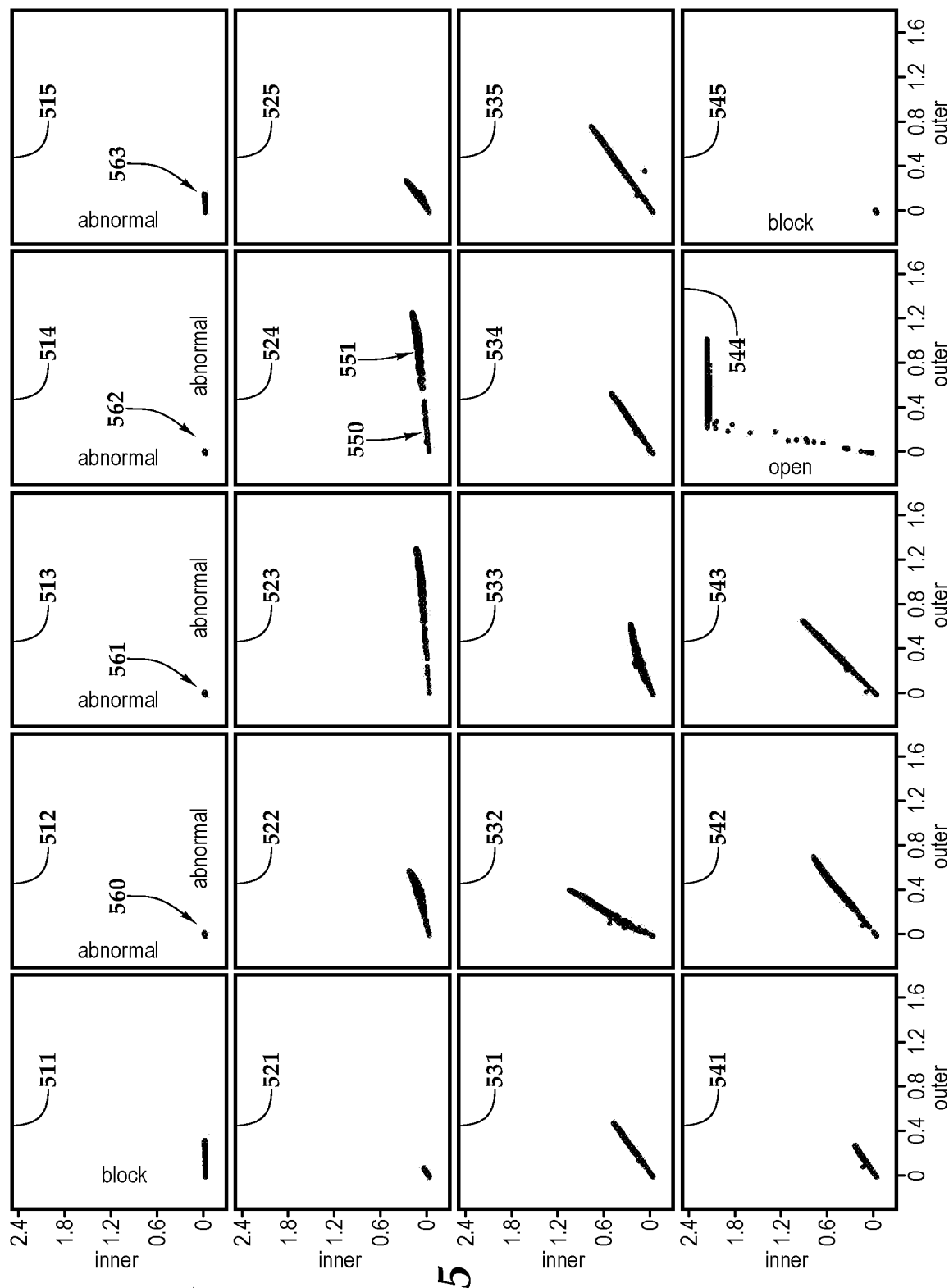
FIG. 5 illustrates a box chart of data that may be collected using a radiometry system, according to various embodiments.

FIG. 5 illustrates a box chart 500 of data that may be collected using an optical tool system, according to various embodiments. In various embodiments, the data may be collected using an optical tool system, such as optical tool system 300 as illustrated and described above with respect to FIG. 3, and/or using light filters arranged a part of a rotary wheel assembly 400 as illustrated and described with respect to FIG. 4.

Referring back to FIG. 5, in various embodiments the box chart 500 includes a total of twenty total boxes, each box corresponding to data collected using a particular simultaneous channel group of an optical tool system. In FIG. 5, the top row of box chart 500 includes boxes 511-515, arranged from left to right across the row. The second row from the top of box chart 500 includes boxes 521-525, arranged from left to right. The third row from the top of box chart 500 includes boxes 531-535, arranged from left to right across the row. The bottom row of box chart 500 includes boxes 541-545, arranged from left to right. As such, box chart 500 includes a total of twenty individual boxes, and as mentioned above, each box corresponding to data detected and measured for one pair of light filters, representing one simultaneous channel group. The total number of twenty boxes as illustrated in chart 500 represents an optical tool that incorporates twenty sets of light filters, each of the sets of light filters including a single light filter, or two or more light filters, which are arranged to filter an interact light at a same time. However the total number of sets of light filters, and thus the total number of boxes that could be included in chart 500, is not limited to twenty, or to any particular number, and can be any positive integer number of boxes, and which may correspond to the total number of sets of light filters wherein each light filter included a given set of light filters is configured to filter an interacted light at a same time.

Using box 524 as an example, a vertical axis of box 524 represented the measured intensity of light having passed through the light filter of the inner ring of a particular simultaneous channel group, while the horizontal axis represents the measured intensity of the light having passed through the light filter of the outer ring of the same particular simultaneous channel group. In various embodiments, the units of measure for both the vertical and horizontal axis of each of the boxes in box chart 500 is volts. Each of the boxes in chart 500 is therefore a two-dimensional representation, which corresponds to the number (i.e., two) of channels of filtered light included in each of the simultaneous channel groups. In alternative embodiments wherein the total number of channels of light included in a simultaneous channel group is a single channel, each of the boxes in chart 500 could be a one-dimensional graph. In other alternative embodiments wherein the total number of channels of light included in a simultaneous channel group is three or more, each of the boxes in chart 500 could include a number of dimensions that corresponds to the number of channels of filtered light included in each of the simultaneous channel groups associated with the particular box. Further, in various embodiments, the number of channels of filtered light included in one or more of the simultaneous channel groups can be a different number of channels of filtered light compared to the number of channels of filtered light included in one or more other simultaneous channel groups included in a chart such as chart 500.

Referring again to box 524 of chart 500, the cluster of dots 550 represent the measured values of the light intensity associated with water, and the cluster of dots 551 represent the measured values of light intensity associated with oil, as measured by both of the two channels included in the simultaneous channel group associated with box 524. Each of these clusters of dots is formed from multiple measurements made by rotating the rotary wheel assembly that includes the light filters associated with box 524 so that the light filters have been aligned a number of times with the interacted light beams that have passed through and/or have otherwise interacted with sampled fluid. In various embodiments, the number of dots included in each cluster of dots 550 and dots 551 corresponds to a number of times the light filters associated with box 524 has been brought into alignment with the interacted beams of light. In various embodiments, the number of dots included in the data represented by the clusters of dots 550 and 551 may range from 10 to 10,000 dots.

By performing analysis on the data represented by the clusters of dots 550 and 551, various characteristics may be determined regarding a sample of fluid, such as a formation fluid which may or may not include contaminates such as water or oil based drilling fluid, and which was interacted with by the light from a light source and then passed through the light filters associated with box 524. Due to the configuration of the light filters included in the simultaneous channel group associated with box 524, one or more characteristics and/or a status, such as a multiphase status of the sampled fluids mixed by formation fluid and mud filtrate, may be determined. Additional analysis of the data presented in other boxes in the box chart 500 may be used to further determine and/or confirm the analysis of the sampled fluid provided by one or more of the other boxes within the box chart.

Certain boxes within the box chart 500 correspond to a simultaneous channel group that, because of their configuration of the light filters in that particular simultaneous channel group, will not provide useful information for the analysis of the sampled fluid. For example, box 511 and box 545 are associated with light filters that are completely or substantially opaque to the wavelengths of light being provided to these light filters, and therefore do not perform a filtering function that provides useful information regarding the sampled fluid itself. These blocked channels however may be useful for example in determining other parameters associated with the optical system, such as in determining levels of background noise present in the system. Boxes 511 and 545 are labeled in the box chart 500 as "block," and data within these blocks would be removed from the data used to perform the calculations associated with the analysis of the sampled fluid. In other examples of boxes that will not provide useful information of the analysis of the sampled fluid itself, bock 544 is labeled as an "open" box. Box 544 may be associated with a simultaneous channel group that includes completely transparent light filters, which do not filter or otherwise change the configuration of wavelengths of light passing through these light filters. While not necessarily providing information related the characteristics and/or a status of the sampled fluid, the data collected in box 544 may be useful for example to calibrate the light levels that have interacted with the sampled fluid with respect to the filtered light data from other boxes within box chart 500.

In addition to the blocked simultaneous channel groups (box 511, 545), and the open simultaneous channel groups (box 544), boxes 512, 513, 514, and 515 have been determined to be "abnormal" channels. Simultaneous channel groups determined to be "abnormal" may receive this designation based on the analysis of the data provided within the respective box, and according to the various techniques described herein. In box chart 500, data cluster 560 of box 512, data cluster 561 of box 513, data cluster 562 of box 514, and data cluster 563 of box 515 are all considered to be not useful for analysis of the characteristics and/or status of the sampled fluid, and therefore are labeled as "abnormal." Once a channel has been designated as "abnormal," the data from that simultaneous channel group is no longer included in the overall analysis being performed on the data provided within the boxes of box chart 500 designated as "normal" channels in determining the characteristics and/or a current status of the sample of fluid based on the data collected in these or non-blocked, non-open, and non-abnormal simultaneous channel groups.

By eliminating the data form the abnormal boxes of box chart 500, a more accurate determination may be made of the actual characteristics and/or a status of the sampled fluid. As the data set provided as part of the data included in the box chart increases in number, and/or as more recent data in time is added to the data set, the evaluation of each non-blocked and non-open block may be performed, for example based on the most recently collected data timewise, and/or based on a sliding window that includes only a predetermined number of data points including the latest data collected. As such, the analysis performed to determine whether the data provided by each of the simultaneous channel groups, and thus the individual boxes within box chart 500, is classified as "normal" or "abnormal" is referred to as "adaptive," because the status for any given box may change as the additional data is collected over time. For example, a re-evaluation of each of boxes 512, 513, 514, and 515 may determine that the data included in a particular box previously labeled as "abnormal" is now useful in determining the status and/or one or more characteristics of the sampled fluid, and the data from any of the blocks now classified as being "normal" will be incorporated into the fluid analysis. In addition, any of boxes 521-525, 531-535, and 541-543 that are classified as "normal" may be reclassified as "abnormal," and the data associated with the box no longer used in the analysis of the fluid, based on the various methods and techniques described herein for determining the "normal" versus "abnormal" classification for the individual boxes.

In the subsurface optical measurement, the photodetectors measure the total transmitting energy passing through a series of light filters instead of the narrow band spectrum on each wavelength (which is commonly measured in laboratory analysis). The total transmitted energy can be expressed by Equation (1) as follows:

$$d_i = \int T(\lambda) f_i(\lambda) d\lambda, \tag{1}$$

where i is the channel index of optical filters, $d_i$ is the observed light energy on the i-th channel, and $T(\lambda)$ is the unknown light density of wavenumber $\lambda$ transmitted through the sampled fluids mixture, $f_i(\lambda)$ is the transfer function for the i-th channel optical filter, which is designed and configured on the device before sampling and measurement experiments. As described above, there are usually three kinds of optical light filters configured in a subsurface spectroscopy:

The Open Channels: all-pass transfer function used for the calibration of the total response of the light source, and optical passes.

The Block Channels: all-zero transfer function used for the calibration of the background noise and photodetector response.

The Normal Channels: transfer functions used for the composition analysis of the fluid samples. The transfer functions are usually non-correlated, with a design based on the characteristic absorbing wavelengths of compositions of the sampled fluids.

Data observed on either open channels or block channels does not normally include any effective information to distinguish the mud fluids from the formation fluids. If these non-useful channels are known during the device configuration, and fluid analysis algorithm can avoid them easily by loading the configuration file information associated with the optical tool being utilized. In a typical application, all the remaining "normal" channels are used and assumed to be effective in mud contamination assessment and composition analysis. However, in the practical cases, there are several reasons that some of the normal channels become ineffective. It may because of the manufacture errors of the optical filters $f_i(\lambda) + \Delta f$. It may also because of the mismatch of the characteristic absorbing wavelengths of the sampled fluids in practice and the wavelengths optimized in the configured filters $f_i(\lambda + \Delta\lambda)$. Some optical light filter may also be blurred (dust, fluids contamination on the optical glass) to acquire the effective information for the fluid samples $f_i(\lambda) g(\lambda)$. Further, the pre-designed optical light filters may be optimized for the common formation oil, gas, but not for the mud filtrate (whose compositions are usually unknown) $T(\lambda) + \Delta T(\lambda)$. As gas and oil have similar absorbing wavelengths, the optical filter with transfer function of a narrow band near the similar absorbing wavelength cannot distinguish their compositions (but may be effective for water detection) $T_o(\lambda) = T_g(\lambda)$.

Figure 5A:
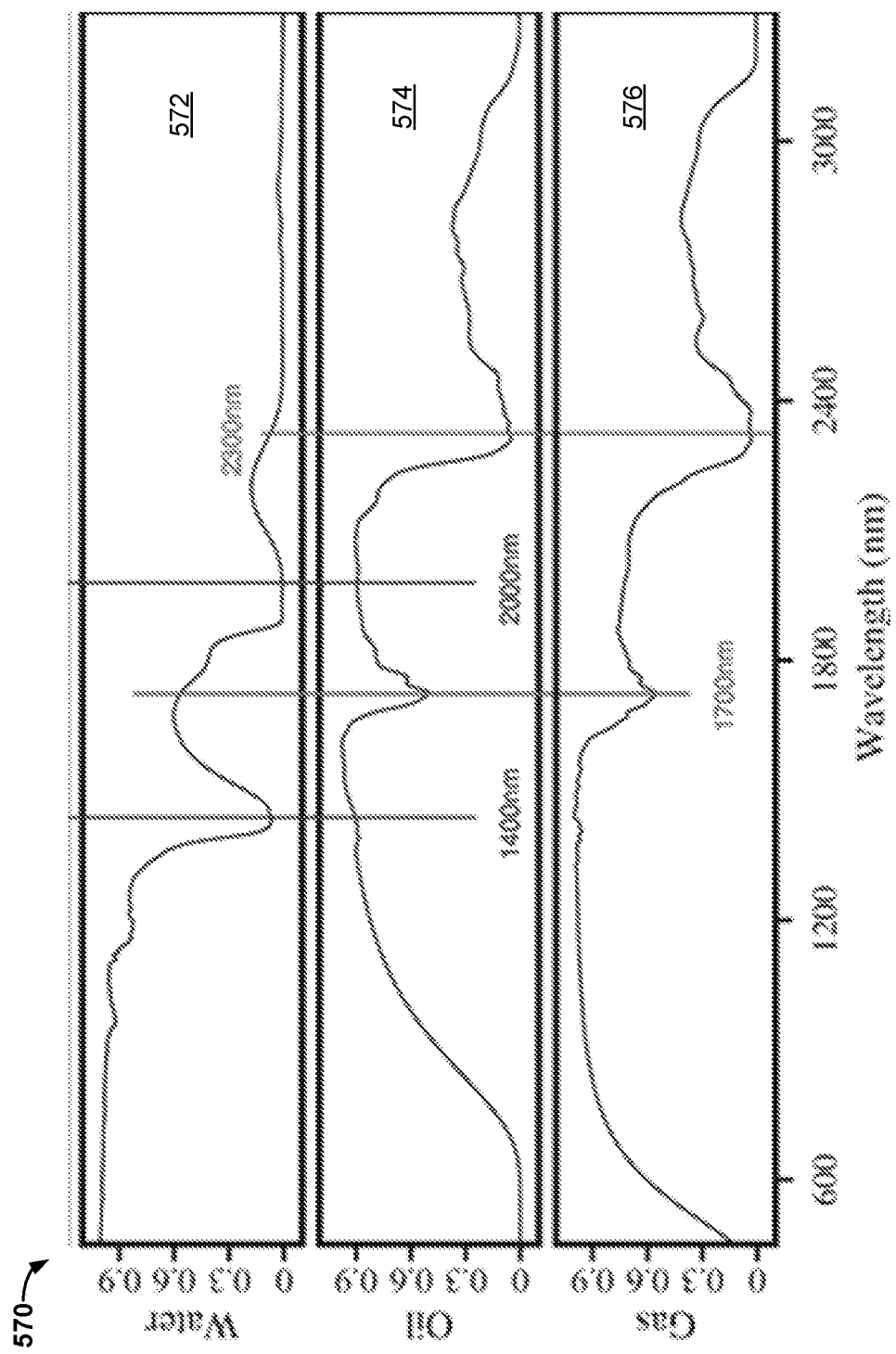
FIG. 5A illustrates different optical absorbing characteristics of water, oil, and gas as a function of wavelengths of light.

As illustrated in FIG. 5A, different optical absorbing characteristics of water (graph 572), oil (graph 574), and gas (graph 576) as a function of wavelengths of light are illustrated. As shown in graphs 570, water has absorbing peaks at the wavelengths around 1400 nanometers and 2000 nanometers, while hydrocarbons such as oil and gas have their absorbing peaks at wavelengths of around 1700 nanometers and 2300 nanometers. Further, water may have a different amplitude of responses when comparted to oil and gas on the channel(s) in which their transfer covers characteristic wavelengths. For example, a phase signal near 1400 nanometers may have weak amplitude for water, wherein the phase signal may have a stronger amplitude for oil and/or for gas.

As the configuration file information cannot provide any information on the reliability of the normal channels, the systems, apparatus, methods and techniques as described herein provide an adaptive measure of the effectiveness for the normal channels, and detect the channels of low effectiveness as abnormal channels. The adaptive measure of effectiveness is defined on the cross-plots of the paired channels as illustrated by box chart 500 (FIG. 5). It is based on the discovery that on the 2D cross-plots, the sensitive channels pairs should have a strip-shape distribution as the compositions or phases of the mixed fluid flow change, while the insensitive simultaneous channel groups may have a dot-like distribution.

Referring back to FIG. 5, box chart 500 illustrates data transmittance of light going through a sampled multiphase fluid flow and a set of twenty simultaneous channel group. Based on the ICS configuration file, there are two block channels (511 and 545), and one open channel (544). These channels cannot provide effective distribution information on the phase changes of the fluid flow. Of the remaining channels, simultaneous channel groups associated with boxes 521-525, 531-535, and 541-543 can provide effective distribution information for mud and formation fluids, and are designated as "normal" channels. The simultaneous channel groups associated with boxes 512, 513, 514, and 515 are determined as not able to provide effective distribution information for mud and formation fluids, and are considered and designated as "abnormal" channels. The data from these "abnormal" channels will be removed from the data used to perform the analysis on the formation fluids.

In conventional multiphase data processing, the open channel, block channels are dropped based on the ICS configuration file during the fluid ratio estimation step. However, as described above not every channel in every instance can provide any information, effective information for fluid identification, even they are marked as "normal channels" in the configure file and be used in the fluid ratio estimation. In practical cases, the abnormal channels may be in other simultaneous channel group(s) depending on the compositions of the formation fluids and the design of transfer functions for the optical filters. The effectiveness of each channel is highly related to the sampled fluids, and cannot be provided by the configuration file, so an adaptive measure of effectiveness directly based on the optical data itself is significant.

In various embodiments, the methods and techniques as described herein are configured to identify any of these simultaneous channel groups that may not provide useful information for identifying the composition and/or a status, such as multiphase status of the sampled fluid. As described above, once these simultaneous channel group are identified, they are designated as "abnormal" channels. In various embodiments, the effectiveness for each simultaneous channel group is estimated based on the data distribution, for example as shown in the respective cross-plot as represented by a respective box in the box chart 500. As an illustrative and non-limiting example, assume there are n optical measurements in a simultaneous channel group, wherein in FIG. 5 $x_k$ is the measurements on the outer channel, $y_k$ is the measurements on the inner channel, (but in practical implementation, the two channels can be exchanged with respect to the x/y axis), the data for the simultaneous channel group may be described by Equation 2 as follows:

$$(x_1,y_1),(x_2,y_2),(x_3,y_3),\ldots,(x_n,y_n) \quad (2)$$

The effectiveness of this simultaneous channel group based on the dispersion of the optical data on the 2D cross-plot is defined by Equation 3 as:

$$E = \sqrt{\sigma_x^2 + \sigma_y^2}, \quad (3)$$

where $\sigma_x$, $\sigma_y$ are the statistical measures for the dispersion of optical data on the outer and inner channel, respectively. As an example, $\sigma_x$, $\sigma_y$ can be the variances of the optical data:

$$\sigma_x = \frac{1}{n}\sum_{k=1}^{n}(x_k - \mu_x)^2, \mu_x = \frac{1}{n}\sum_{k=1}^{n}x_k \quad (4)$$

$$\sigma_y = \frac{1}{n}\sum_{k=1}^{n}(y_k - \mu_y)^2, \mu_y = \frac{1}{n}\sum_{k=1}^{n}y_k \quad (5)$$

In the general cases with K channels in a simultaneous channel group, the total effectiveness of equation 3 can be defined as $$E = \sqrt{\sum_{k=1}^{K}\sigma_k^2},$$

wherein K is the number optical channels included in a given simultaneous channel group.

There are multiple other options used to replace ax, ay as the dispersion measures for the inner and outer channel data, such as (but not limited to) the range (the difference between the maximal and the minimal values), the interdecile range, the mean absolute difference, the median absolute difference, the average absolute deviation or the distance standard deviation. Using any of them follows the main idea that the dispersion measure can indicate the effectiveness or sensitivity of the optical data. In various embodiments, the calculated effectiveness value for a given simultaneous channel group, e.g., as determined by Equation 3, may be compared to an effectiveness threshold value. In various embodiments, the effectiveness threshold value may user determined, for example based on results obtained from field testing. In various embodiments, if the calculated effectiveness value for a given simultaneous channel group is below the effectiveness threshold value, the channel is considered to be ineffective in providing information that may be useful in the analysis of the sample of downhole fluid, and is classified as an "abnormal" channel. Data associated with the "abnormal" simultaneous channel group may be removed from the data used to perform the analysis of the sampled fluid. In the alternative, if a calculated effectiveness value for a particular simultaneous channel group is above (or in some embodiments at) the effectiveness threshold value, this indicates that the data associated with that simultaneous channel group is effective in providing information that is useful for the analysis of the fluid sample, and the simultaneous channel group is classified as a "normal" channel. Data associated with the "normal" simultaneous channel group may be retained in the data used to perform the analysis of the fluid sample.

The defined effectiveness measure for the optical data can be used in both the oil-based mud cases and the water-based mud cases. In the former cases, the effectiveness measure can be used in composition analysis for the single phase fluid flow; in the latter cases, the effectiveness measure can improve the mud fluid contamination assessment for the multi-phase fluid flow.

As explained above, the effectiveness provides the information regarding how sensitive the optical data on each channel is relative to the fluid compositions. The more sensitive a channel is, the more likely the channel is to being capable of providing reliable information for composition inversion. The general composition analysis for a sampled fluid mixture is expressed in Equation 6 as the following optimization:

$$\min_{c_m} \sum_{i=1}^{Nc} \left( d_i - \int T(\lambda) f_i(\lambda) d\lambda \right)^2, \quad (6)$$

with the total transmittance of the mixture of M current trial fluid compositions expressed by Equation 7 as follows:

$$T(\lambda) = 10^{-\gamma \sum_{m=1}^{M} c_m \varepsilon_m}. \quad (7)$$

In practical applications, only a limited number of optical filters may be configured in the subsurface spectroscopy. The above optimization problem is highly underdetermined, and the solutions are usually not so physically reasonable. With the effectiveness measure of the observations $d_i$, prior information of the reliabilities is known, and the optimization can be improved.

Instead of finding a solution matching all the observations equally as in Equation 7, embodiments include a solution which matches the observations of high reliabilities more strictly than those low-reliability observations. It can be implemented by the following optimization, which minimizing the summation of the matching errors with weights of their reliabilities, using Equation 8 as follows:

$$\min_{c_k} \sum_{i=1}^{Nc} E_i^2 \left( d_i - \int T(\lambda) f_i(\lambda) d\lambda \right)^2, \quad (8)$$

As the matching errors of the observations with higher reliabilities contribute more to the optimization objective, the final solution depends more on the high-reliability observations. Thus, the solution would be more possible to converge to the physical solution. Despite using the effective measure as a weighting of the matching error, there may be other methods to use this prior information in the composition inversion: it can be used as an additional constraint, pre-conditioning or post-conditioning parameters. Any of these methods that include using the effective measure as prior reliability information of optical observations may improve the final composition inversion.

In the analysis of multiphase fluid flow, the mud fluid ratio may be estimated based on the fluid identifications of optical data on each simultaneous channel group. When there are simultaneous channel groups that are not sensitive to the mud fluids and formation fluids, the optical data is ineffective for clustering and fluid identification. Those simultaneous channel group may lead to inaccurate fluid ratio estimation. To improve the fluid ratio estimation accuracy, this disclosure proposes an adaptive abnormal channel detection procedure to reduce the effects of ineffective channels. The detection procedure is based on the observed optical data instead of the configuration file.

Figure 6:
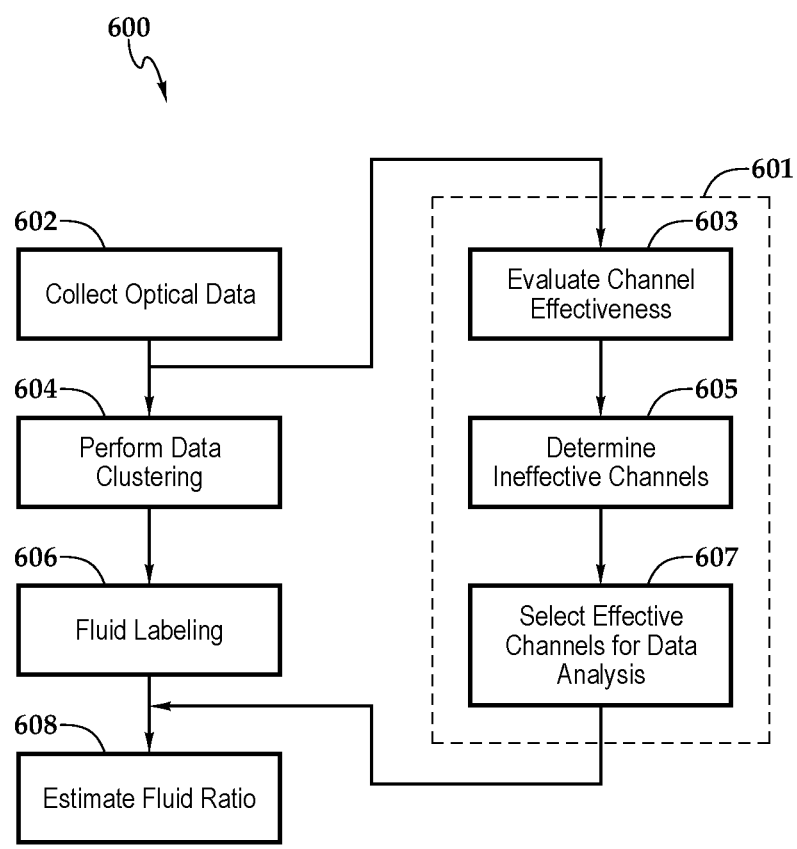
FIG. 6 illustrates a method, according to various embodiments.

FIG. 6 illustrates a method 600, according to various embodiments. Embodiments of method 600 may be performed by various components included in an optical tool system, such as optical tool system 300 as illustrated and described with respect to FIG. 3.

Embodiments of method 600 include collecting optical data (block 602). In various embodiments, collecting optical data comprises providing a light from a light source that is directed to interact with a sample of downhole fluid to produce an interacted light. In various examples, a single beam of the interacted light is directed to a light filter, and passes through the light filter to form a simultaneous channel group comprising a single beam of filtered light. In various embodiments, the interacted light is divided into two or more separate interacted light beams. Each of the separated interacted light beams is directed to separate light filters, forming a simultaneous channel group of filtered light beams. The filtered light beam or beams is/are detected, and one or more parameters of the detected light beam(s) is/are measured to collect optical data. A variety of different sets of optical light filters may be aligned with the separated interacted light beam(s) to provide a set of data for each of the channels included in a simultaneous channel group as part of collecting the optical data.

Embodiments of method 600 include evaluating the effectiveness of each of the simultaneous channel groups for which data has been collected (block 603). Determine the effectiveness of each of the each of the simultaneous channel groups may comprise using any of the techniques described above as part of this disclosure, or any equivalents thereof. Based on the evaluation of the effectiveness of each of the simultaneous channel groups, embodiments of method 600 proceed to determining which, if any of the evaluated simultaneous channel groups, are ineffective in providing data that is useful for evaluating the characteristics and/or for determining a status, such as multiphase status, of the samples of fluid associated with the optical data generated by the sample of fluid (block 605). In various embodiments, the determination that a simultaneous channel group is ineffective may be based on comparing a calculated parameter for the data collected for a particular simultaneous channel group to a threshold value.

Embodiments of method 600 include selecting effective simultaneous channel groups for data analysis by elimination of the simultaneous channel group(s) determined to be ineffective (block 607). In various embodiments, selecting the effective simultaneous channel groups comprises removing data from the simultaneous channel group(s) that were determined to be ineffective (i.e., channels designated as "abnormal") from the data that will be used to perform the analysis of the formation fluid.

Upon selection of the effective channels for data analysis as performed at block 607, embodiments of method 600 proceed to estimating a fluid ratio (block 608). The estimation of the fluid ratio for the formation fluid may include determining a ratio of the water included in the formation fluid. In various embodiments, determining the ratio of water includes determining that the formation fluid is in a multiphase or a single phase state.

In parallel with the evaluation and determination of the effectiveness of the simultaneous channel groups (as indicated by the blocks enclosed in dashed box 601), embodiments of method 600 may include performing data clustering (block 604). Clustering is a technique of grouping the channels according to a phase, whereas other methods may include pattern recognition, or predetermined vector projections. Nonlinear methods, including but not limited to, neural network classification may also be appropriate. During the optical data clustering, the optical data may be separated into at least two groups, wherein the separation is based on amplitude responses on each channel of optical data. The optical data generated after clustering may be organized into two or more groups for each of the simultaneous channel groups. However, the fluid type for each of the two or more groups may comprise a single fluid or a plurality of fluids.

Following performing data clustering, embodiments of method 600 include performing fluid labeling (block 606). Fluid labeling may comprise determining a specific type of fluid, whereas the fluid may comprise oil, gas, or solids. Determining the fluid or the fluid composition may comprise identifying the phase of the particular cluster. The determination of a cluster's phase may include a priori knowledge of at least one of a plurality of non-optical sensor, wherein non-optical sensor may comprise density channels, aqueous channels, organic channels, and the like, and combinations thereof. It should be noted that a priori knowledge may include data from the field or laboratory data. Fluid labeling phases may comprise at least two levels of computation. For example, fluid labeling may comprise a fluid ratio extraction, wherein a volume extraction of the ratio of the phases may be determined. In addition, the labeling may comprise a fluid phase signal extraction. The fluid phase signal extraction may be completed, wherein the phase signals are extracted and separated into at least two groups (not shown), such as Group 1 and Group 2. The two levels of computation may comprise computing the total amount of phase in Group 1 and also computing the total amount of phase in Group 2. It should be noted that phase signals may be separated into water (aqueous), oil (organic), gas, or solid phase signals. The separation of phase signals provides a resulting pure phase signal, thereby enabling the estimation of the phase, wherein a composition analysis may be run on the phase. This enables a multiphase composition analysis. In general, it should be noted that current systems are not designed for multi-phase composition analysis.

The resultant output of the fluid labeling may be provided, in an iterative manner, with the output of the selection of the data form the effective simultaneous channel groups at block 607, to perform the estimated fluid ratio. As new data is collected at block 602, for example by the operation of a rotary optical assembly comprising a plurality of optical filters forming the simultaneous channel groups, the steps of method 600 as described above may be repeated a number of times to continue the analysis of the data related to the sampled fluid over time as new optical data is collected.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 400 or as a general purpose computer, some embodiments can be any type of device or apparatus to perform operations described herein.

Figure 7A:
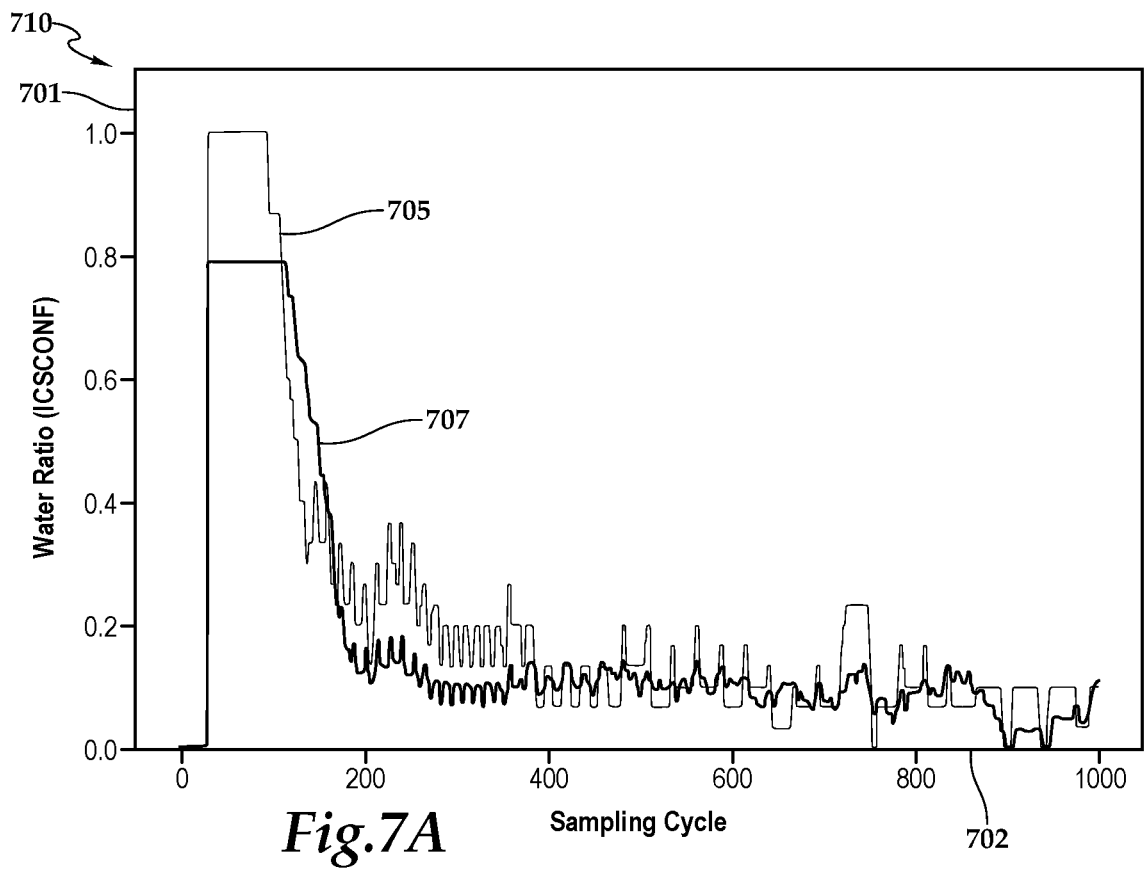
FIG. 7A illustrates a graph comparing a measured water ratio in a downhole fluid sample using a density measurement to the water ratio determined using optical analysis but without screening for abnormal channels, according to various embodiments.

FIG. 7A illustrates a graph 710 comparing a measured water ratio in the sampled fluid using a density measurement to the water ratio determined using optical analysis, but without screening for abnormal channels, according to various embodiments. Vertical axis 701 of graph 710 is the measured water ratio. Horizontal axis 702 is the number of sampling cycles. At the first stage of sampling (0-100 sampling circles), the pipe containing the sampled fluid to be analyzed is filled with mud water. The measurement strategy illustrated in graph 710 and based on an ICS configuration file as graphical line 707 reports an initial water ratio about 80%, which is much less than the true value, as illustrated by a density measurement taken for the same sample cycles as illustrated by graphical line 605. As the fluid identification using the ICS file configuration is not effective for in eliminating the data from abnormal channels, the water ratio estimations for those channels are not considered to be reliable, and therefore may bury the high-resolution details of the water ratio measurements.

Figure 7B:
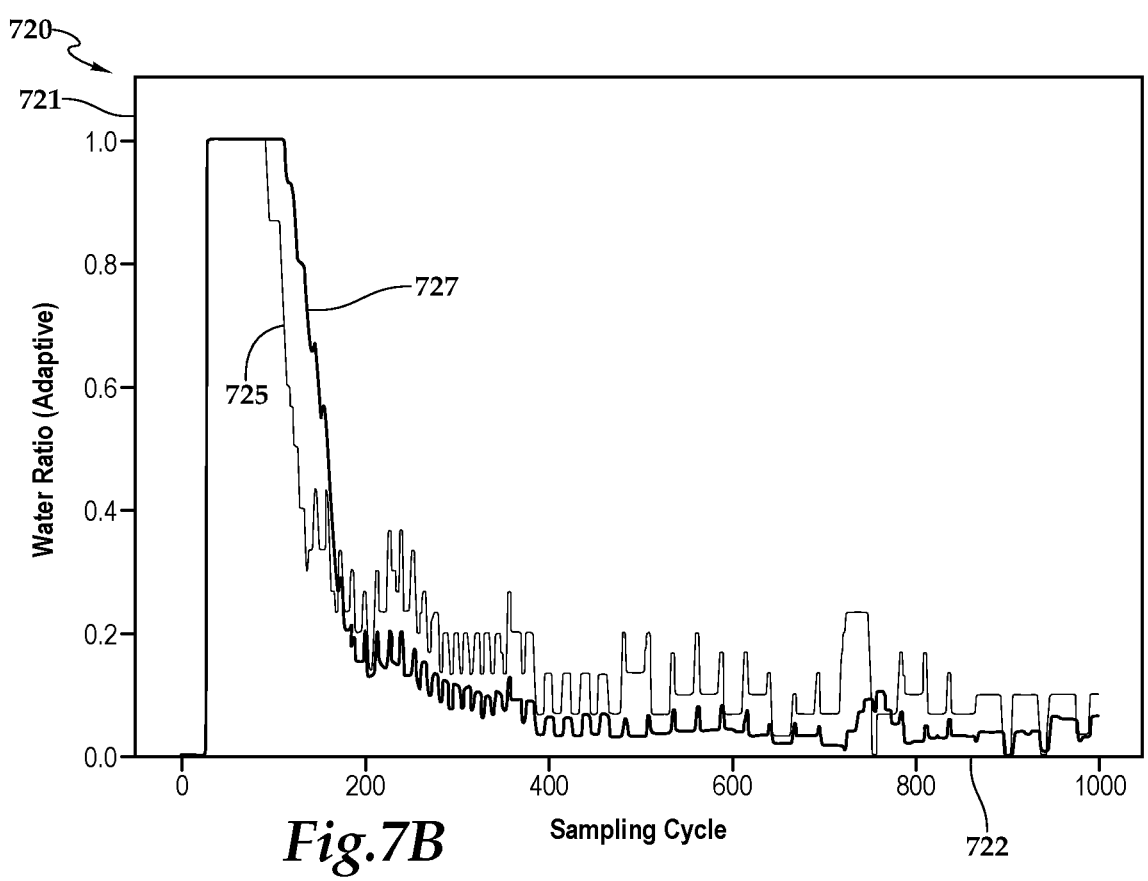
FIG. 7B illustrates a graph comparing a measured water ratio in a downhole fluid sample using the same density measurement utilized in the graphs of FIG. 6A to the water ratio determined using optical analysis and with screening for abnormal channels, according to various embodiments.

FIG. 7B illustrates a graph 720 comparing a measured water ratio in the sampled fluid using the same density measurement utilized in graph 710 of FIG. 7A to the water ratio determined using optical analysis and with screening for abnormal channels, according to various embodiments.

Graph 720 was developed using the same data set as was used to generate the graphical lines depicted in graph 610 of FIG. 7A. With the adaptive abnormal channel detection, besides the open channel and block channels, some normal channels with low effectiveness values are labelled as abnormal channels. Once these "abnormal" channels have been detected, all of the data collected from these channels is ignored during the water ratio calculation. As shown by graphical line 725 in graph 720, the estimated water ratio is 100%, which matches with the physical condition at that stage, as illustrated by the correspondence between graphical line 725 representing the measured water ratio and graphical line 727, which illustrates the water ratio measured using a density measurement. From the comparison of graph 710 with graph 720, the estimation of the water ratio based on adaptive abnormal channel detection has more details correlated to the density-based estimation. The data illustrates that the proposed abnormal channel detection as described herein, and the removal of data from the detected abnormal channels is effective to find out those channels, avoid their interferences, and bring more details to the final water ratio estimation.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, which employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

While the aspects of the disclosure are described with reference to various implementations and exploitations, it will be understood that these aspects are illustrative and that the scope of the claims is not limited to them. In general, techniques for automatically pressure testing frac iron described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example embodiments include the following.

Embodiment 1. A method comprising: collecting optical data associated with a plurality of simultaneous channel groups, wherein each of the simultaneous channel groups includes data collected from sensing one or more beams of light that has interacted with a sample of a fluid collected downhole in a wellbore, each of the one or more beams of light having been passed through a respective light filter configured to filter one or more wavelengths of light from the beam of light; for each of the plurality of simultaneous channel groups, evaluating the optical data associated with the simultaneous channel group to determine that the data for that simultaneous channel group is either effective or ineffective in providing information regarding the sample of the fluid; for any simultaneous channel groups determined to be ineffective in providing information regarding the sample of the fluid, removing the optical data associated with that particular simultaneous channel groups from a data set of the optical data; and performing an analysis of the data set including only optical data associated with any of the simultaneous channel groups determined to be effective in providing information regarding the sample of the fluid.

Embodiment 2. The method of embodiment 1, wherein performing the analysis of the data set includes determining a water ratio of the sample of the fluid.

Embodiment 3. The method of embodiments 1 or 2, wherein collecting the optical data associated with the plurality of simultaneous channel groups includes for each of the plurality of simultaneous channel groups sensing each of the one or more beams of light a number of times.

Embodiment 4. The method of any one of embodiments 1-3, wherein evaluating the optical data associated with each of the plurality of simultaneous channel groups includes: determining an effectiveness value for the simultaneous channel group based on a dispersion of the optical data associated with the simultaneous channel group; comparing the effectiveness value determined for the simultaneous channel group to an effectiveness threshold value; and classifying the simultaneous channel group as ineffective in providing information regarding the sample of the fluid when the effectiveness value is less than an effectiveness threshold value.

Embodiment 5. The method of embodiment 4, wherein the effectiveness value for the simultaneous channel group is defined by the equation:

$$E = \sqrt{\sum_{k=1}^{K} \sigma_k^2},$$

wherein E is an effectiveness measure of the simultaneous channel group, $\sigma_k$ is the statistical measures for the dispersion of optical data collected from sensing the light beam of the $k^{th}$ optical channel, and K is the total number of channels included in the simultaneous channel.

Embodiment 6. The method of embodiment 5, wherein the simultaneous channel group includes two light channels, and wherein $\sigma_x$, $\sigma_y$ are the variance of the optical data sensed from the first beam of light and the optical data sensed from the second beam of light, respectively.

Embodiment 7. The method of any one of embodiments 1-6, wherein evaluating the optical data associated with each of the plurality of simultaneous channel group includes: determining an effectiveness value for the simultaneous channel group based on a range value comprising a difference between a maximal value and minimal value of the data collected for the simultaneous channel group; comparing the range value determined for the simultaneous channel group to a range threshold value; and classifying the simultaneous channel group as ineffective in providing information regarding the sample of the fluid when the range value is less than the range threshold value.

Embodiment 8. The method of any one of embodiments 1-7, wherein the sample of the fluid comprises a multiphase fluid.

Embodiment 9. The method of any one of embodiments 1-8, wherein the sample of the fluid comprises a single phase fluid.

Embodiment 10. The method of any one of embodiments 1-9, wherein collecting optical data associated with the plurality of simultaneous channel groups includes collecting optical data associated with at least one simultaneous channel group comprising one or more blocked channels having an all-zero-transfer function that is used for calibrating a background noise.

Embodiment 11. The method of any one of embodiments 1-10, wherein collecting optical data associated with the plurality of simultaneous channel groups includes collecting data associated with at least one open simultaneous channel group having an all-pass transfer function that is used to calibrate a total response of a light source providing the light beam that is interacted with the sample of the fluid.

Embodiment 12. A system comprising: an optical tool configured to provide analysis of a sample of a fluid collected while operating downhole in a wellbore, the optical tool including a plurality of light filters, each of light filters configured to filter one or more wavelengths of light from a respective light beam that has interacted with the sample of the fluid to generate one or more filtered light beams included in a simultaneous channel group; one or more light detectors configured to sense the one or more filtered light beams, and to generate a data set for the simultaneous channel group associated with the one or more filtered light beams that were filtered as a same time; and a computing device including a processor configured to: for each of a plurality of the simultaneous channel groups, evaluate optical data associated with the simultaneous channel group to determine that the data set for that particular simultaneous channel group is either effective or ineffective in providing information regarding the sample of fluid; for any simultaneous channel group determined to be ineffective in providing information regarding the sample of the fluid, remove the optical data associated with that particular simultaneous channel group from the data set of the optical data; and perform an analysis of the data set including only optical data associated with any of the simultaneous channel groups determined to be effective in providing information regarding the sample of fluid.

Embodiment 13. The system of embodiment 12, wherein the optical tool further comprises: a light source configured to output a light; a conduit configured to allow the sample of the fluid to interact with a light from the light source to generate and interacted light; and a beam splitter to divide the interacted light into at least a first beam of interacted light and a second beam of interacted light, wherein a pair of light filters includes a first light filter configured to receive the first beam of interacted light and to filter one or more wavelengths of light to generate the first filtered beam of light, and a second light filter configured to receive the second beam of interacted light and to generate the second filtered beam of light at the same time as the first filtered beam of light is being generated.

Embodiment 14. The system of embodiment 13, wherein the plurality of light filters are arranged in pairs on a circular shaped disk as concentric circles included in an outer ring of light filters and an inner ring of light filters, and wherein the circular shaped disk is configured to rotate in order to place each of the pairs of light filters in alignment with and second beam of interacted light in a sequence in time.

Embodiment 15. The system of any one of embodiments 12-14, wherein the computing device is further configured to: determine an effectiveness value for the simultaneous channel group based on a dispersion of the optical data associated with the simultaneous channel group; compare the effectiveness value determined for the simultaneous channel group to an effectiveness threshold value; and classify the simultaneous channel group as ineffective in providing information regarding the sample of the fluid when the effectiveness value is less than an effectiveness threshold value.

Embodiment 16. The system of embodiment 15, wherein the effectiveness value for the simultaneous channel group is defined by the equation:

$$E = \sqrt{\sum_{k=1}^{K} \sigma_k^2},$$

wherein E is an effectiveness measure of the simultaneous channel group, $\sigma_k$ is the statistical measures for the dispersion of optical data collected from sensing the light beam of the k optical channel, and K is the total number of channels included in the simultaneous channel.

Embodiment 17. The system of embodiment 16, wherein the simultaneous channel group includes two light channels, and wherein $\sigma_x$, $\sigma_y$ are the variance of the optical data sensed from the first beam of light and the optical data sensed from the second beam of light, respectively.

Embodiment 18. The system of any one of embodiments 12-17, wherein the computing device is configured to perform the analysis of the data set including determining a water ratio for the sample of fluid.

Embodiment 19. A non-transitory computer readable medium storing machine readable instructions that are executable by a processor to cause the processor to perform operations comprising: receiving optical data associated with a plurality of simultaneous channel groups, wherein each of the simultaneous channel groups includes data collected from sensing one or more beams of light that has interacted with a sample of a fluid collected downhole in a wellbore, each of the one or more beams of light having been passed through a respective light filter configured to filter one or more wavelengths of light from the beam of light; for each of the plurality of simultaneous channel groups, evaluating the optical data associated with the simultaneous channel group to determine that the data for that simultaneous channel group is either effective or ineffective in providing information regarding the sample of the fluid; for any simultaneous channel group determined to be ineffective in providing information regarding the sample of the fluid, removing the optical data associated with that particular simultaneous channel group from a data set of the optical data; and performing an analysis of the data set including only optical data associated with any of the simultaneous channel groups determined to be effective in providing information regarding the sample of the fluid to determine one or more properties associated with the sample of the fluid.

Embodiment 20. The non-transitory computer readable medium of embodiment 19, wherein evaluating the optical data associated with each of the plurality of simultaneous channel groups includes: determining an effectiveness value for the simultaneous channel group based on a dispersion of the optical data associated with the simultaneous channel group; comparing the effectiveness value determined for the simultaneous channel group to an effectiveness threshold value; and classifying the simultaneous channel group as ineffective in providing information regarding the sample of the fluid when the effectiveness value is less than an effectiveness threshold value.

What is claimed is:

1. A method comprising:
    collecting optical data associated with a plurality of simultaneous channel groups, wherein each of the simultaneous channel groups includes data collected from sensing one or more beams of light that has interacted with a sample of a fluid collected downhole in a wellbore, each of the one or more beams of light having been passed through a respective light filter configured to filter one or more wavelengths of light from the beam of light;
    for each of the plurality of simultaneous channel groups, evaluating the optical data associated with the simultaneous channel group to determine that the data for that simultaneous channel group is either effective or ineffective in providing information regarding the sample of the fluid;
    for any simultaneous channel groups determined to be ineffective in providing information regarding the sample of the fluid, removing the optical data associated with that particular simultaneous channel groups from a data set of the optical data; and
    performing an analysis of the data set including only optical data associated with any of the simultaneous channel groups determined to be effective in providing information regarding the sample of the fluid.

2. The method of claim 1, wherein performing the analysis of the data set includes determining a water ratio of the sample of the fluid.

3. The method of claim 1, wherein collecting the optical data associated with the plurality of simultaneous channel groups includes for each of the plurality of simultaneous channel groups sensing each of the one or more beams of light a number of times.

4. The method of claim 1, wherein evaluating the optical data associated with each of the plurality of simultaneous channel groups includes:
    determining an effectiveness value for the simultaneous channel group based on a dispersion of the optical data associated with the simultaneous channel group;
    comparing the effectiveness value determined for the simultaneous channel group to an effectiveness threshold value; and
    classifying the simultaneous channel group as ineffective in providing information regarding the sample of the fluid when the effectiveness value is less than an effectiveness threshold value.

5. The method of claim 4, wherein the effectiveness value for the simultaneous channel group is defined by the equation:

$$E = \sqrt{\sum_{k=1}^{K} \sigma_k^2},$$

wherein E is an effectiveness measure of the simultaneous channel group, $\sigma_k$ is the statistical measures for the dispersion of optical data collected from sensing the light beam of the $k^{th}$ optical channel, and K is the total number of channels included in the simultaneous channel.

6. The method of claim 5, wherein the simultaneous channel group includes two light channels, and wherein $\sigma_x$, $\sigma_y$ are the variance of the optical data sensed from the first beam of light and the optical data sensed from the second beam of light, respectively.

7. The method of claim 1, wherein evaluating the optical data associated with each of the plurality of simultaneous channel group includes:
    determining an effectiveness value for the simultaneous channel group based on a range value comprising a difference between a maximal value and minimal value of the data collected for the simultaneous channel group;
    comparing the range value determined for the simultaneous channel group to a range threshold value; and
    classifying the simultaneous channel group as ineffective in providing information regarding the sample of the fluid when the range value is less than the range threshold value.

8. The method of claim 1, wherein the sample of the fluid comprises a multiphase fluid.

9. The method of claim 1, wherein the sample of the fluid comprises a single phase fluid.

10. The method of claim 1, wherein collecting optical data associated with the plurality of simultaneous channel groups includes collecting optical data associated with at least one simultaneous channel group comprising one or more blocked channels having an all-zero-transfer function that is used for calibrating a background noise.

11. The method of claim 1, wherein collecting optical data associated with the plurality of simultaneous channel groups includes collecting data associated with at least one open simultaneous channel group having an all-pass transfer function that is used to calibrate a total response of a light source providing the light beam that is interacted with the sample of the fluid.

12. A system comprising:
    an optical tool configured to provide analysis of a sample of a fluid collected while operating downhole in a wellbore, the optical tool including a plurality of light filters, each of light filters configured to filter one or more wavelengths of light from a respective light beam that has interacted with the sample of the fluid to generate one or more filtered light beams included in a simultaneous channel group;
    one or more light detectors configured to sense the one or more filtered light beams, and to generate a data set for the simultaneous channel group associated with the one or more filtered light beams that were filtered at a same time; and
    a computing device including a processor configured to:
        for each of a plurality of the simultaneous channel groups, evaluate optical data associated with the simultaneous channel group to determine that the data set for that particular simultaneous channel group is either effective or ineffective in providing information regarding the sample of fluid;

for any simultaneous channel group determined to be ineffective in providing information regarding the sample of the fluid, remove the optical data associated with that particular simultaneous channel group from the data set of the optical data; and perform an analysis of the data set including only optical data associated with any of the simultaneous channel groups determined to be effective in providing information regarding the sample of fluid.

13. The system of claim 12, wherein the optical tool further comprises:

a light source configured to output a light;

a conduit configured to allow the sample of the fluid to interact with a light from the light source to generate and interacted light; and a beam splitter to divide the interacted light into at least a first beam of interacted light and a second beam of interacted light, wherein a pair of light filters includes a first light filter configured to receive the first beam of interacted light and to filter one or more wavelengths of light to generate the first filtered beam of light, and a second light filter configured to receive the second beam of interacted light and to generate the second filtered beam of light at the same time as the first filtered beam of light is being generated.

14. The system of claim 13, wherein the plurality of light filters are arranged in pairs on a circular shaped disk as concentric circles included in an outer ring of light filters and an inner ring of light filters, and wherein the circular shaped disk is configured to rotate in order to place each of the pairs of light filters in alignment with and second beam of interacted light in a sequence in time.

15. The system of claim 12, wherein the computing device is further configured to:

determine an effectiveness value for the simultaneous channel group based on a dispersion of the optical data associated with the simultaneous channel group;

compare the effectiveness value determined for the simultaneous channel group to an effectiveness threshold value; and classify the simultaneous channel group as ineffective in providing information regarding the sample of the fluid when the effectiveness value is less than an effectiveness threshold value.

16. The system of claim 15, wherein the effectiveness value for the simultaneous channel group is defined by the equation:

$$E = \sqrt{\sum_{k=1}^{K} \sigma_k^2},$$

wherein E is an effectiveness measure of the simultaneous channel group, $\sigma_k$ is the statistical measures for the dispersion of optical data collected from sensing the light beam of the $k^{th}$ optical channel, and K is the total number of channels included in the simultaneous channel.

17. The system of claim 16, wherein the simultaneous channel group includes two light channels, and wherein $\sigma_x$, $\sigma_y$ are the variance of the optical data sensed from the first beam of light and the optical data sensed from the second beam of light, respectively.

18. The system of claim 12, wherein the computing device is configured to perform the analysis of the data set including determining a water ratio for the sample of fluid.

19. A non-transitory computer readable medium storing machine readable instructions that are executable by a processor to cause the processor to perform operations comprising:

receiving optical data associated with a plurality of simultaneous channel groups, wherein each of the simultaneous channel groups includes data collected from sensing one or more beams of light that has interacted with a sample of a fluid collected downhole in a wellbore, each of the one or more beams of light having been passed through a respective light filter configured to filter one or more wavelengths of light from the beam of light;

for each of the plurality of simultaneous channel groups, evaluating the optical data associated with the simultaneous channel group to determine that the data for that simultaneous channel group is either effective or ineffective in providing information regarding the sample of the fluid;

for any simultaneous channel group determined to be ineffective in providing information regarding the sample of the fluid, removing the optical data associated with that particular simultaneous channel group from a data set of the optical data; and performing an analysis of the data set including only optical data associated with any of the simultaneous channel groups determined to be effective in providing information regarding the sample of the fluid to determine one or more properties associated with the sample of the fluid.

20. The non-transitory computer readable medium of claim 19, wherein evaluating the optical data associated with each of the plurality of simultaneous channel groups includes:

determining an effectiveness value for the simultaneous channel group based on a dispersion of the optical data associated with the simultaneous channel group;

comparing the effectiveness value determined for the simultaneous channel group to an effectiveness threshold value; and classifying the simultaneous channel group as ineffective in providing information regarding the sample of the fluid when the effectiveness value is less than an effectiveness threshold value.

* * * * *